(12) United States Patent
Newell et al.

(10) Patent No.: US 6,330,847 B2
(45) Date of Patent: *Dec. 18, 2001

(54) APPARATUS AND METHOD FOR AUTOMATICALLY COMPENSATING FOR LATERAL RUNOUT

(75) Inventors: Harold Newell, S. Newbury; John Wiggins, Sunapee, both of NH (US)

(73) Assignee: Joseph B. Willey, Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/738,353

(22) Filed: Dec. 18, 2000

Related U.S. Application Data

(60) Continuation of application No. 09/480,140, filed on Jan. 10, 2000, which is a division of application No. 08/706,514, filed on Sep. 4, 1996, now Pat. No. 6,050,160.

(51) Int. Cl.[7] .................................................. B23B 5/04
(52) U.S. Cl. ................... 82/112; 82/118; 82/151
(58) Field of Search ................ 82/1.11, 112, 113, 82/134, 151, 152, 904, 118

(56) References Cited

U.S. PATENT DOCUMENTS

| | | |
|---|---|---|
| 1,236,748 | 8/1917 | Osberg et al. . |
| 1,554,302 | 9/1925 | Slyder et al. . |
| 2,546,225 | 3/1951 | Julian et al. . |
| 3,303,709 | 2/1967 | Slisz . |
| 3,373,622 | 3/1968 | Stautmeister . |
| 3,540,164 | 11/1970 | Lanham . |
| 3,663,795 | 5/1972 | Myer . |
| 3,895,539 | 7/1975 | Weman et al. . |
| 3,951,563 | 4/1976 | Ravenhall . |
| 4,226,146 | 10/1980 | Ekman . |
| 4,336,730 | 6/1982 | Kopecko et al. . |
| 4,388,846 | 6/1983 | Kopecko et al. . |
| 4,452,111 | 6/1984 | Anderson . |
| 4,478,116 | 10/1984 | Fuller . |
| 4,493,231 | 1/1985 | Wossner . |
| 4,523,499 | 6/1985 | Aldridge, Jr. . |
| 4,640,158 | 2/1987 | Link et al. . |
| 4,678,408 | 7/1987 | Nason et al. . |
| 4,703,977 | 11/1987 | Haanschoten . |
| 4,854,199 | 8/1989 | Norman . |
| 5,054,918 | 10/1991 | Downing et al. . |
| 5,099,728 | 3/1992 | Thiem . |
| 5,152,166 * | 10/1992 | Brock et al. ............................ 73/37.9 |
| 5,201,586 | 4/1993 | Zimmerman et al. . |
| 5,279,192 | 1/1994 | Hartman . |
| 5,377,549 * | 1/1995 | Werner .................................. 73/860 |
| 5,397,231 * | 3/1995 | Bald ...................................... 425/589 |
| 5,499,563 | 3/1996 | Hansen . |
| 5,549,023 | 8/1996 | Strout et al. . |
| 5,603,733 | 2/1997 | Rogers et al. . |
| 5,615,589 | 4/1997 | Roach . |
| 5,653,153 | 8/1997 | Greenwald . |
| 6,044,310 * | 3/2000 | Douglass ............................... 700/192 |

FOREIGN PATENT DOCUMENTS

| | | | |
|---|---|---|---|
| 1650731 | 2/1974 | (DE) | ........................................ 74/575 |

\* cited by examiner

*Primary Examiner*—Henry Tsai
(74) *Attorney, Agent, or Firm*—Fish & Richardson P.C.

(57) ABSTRACT

An apparatus and method for automatically compensating for the lateral runout between an on-car lathe apparatus and a vehicle hub axis including one or more stop discs that rotate with the drive shaft of the lathe and that can be selectively stopped from rotating with the shaft by a stop mechanism. In response to such stopping, one or more adjustment discs are caused to rotate in order to adjust the relative position of the axis of the lathe with respect to the axis of the disc brake assembly. In this manner, the system compensates for and corrects lateral runout that exists between two concentrically attached rotating shafts.

17 Claims, 21 Drawing Sheets

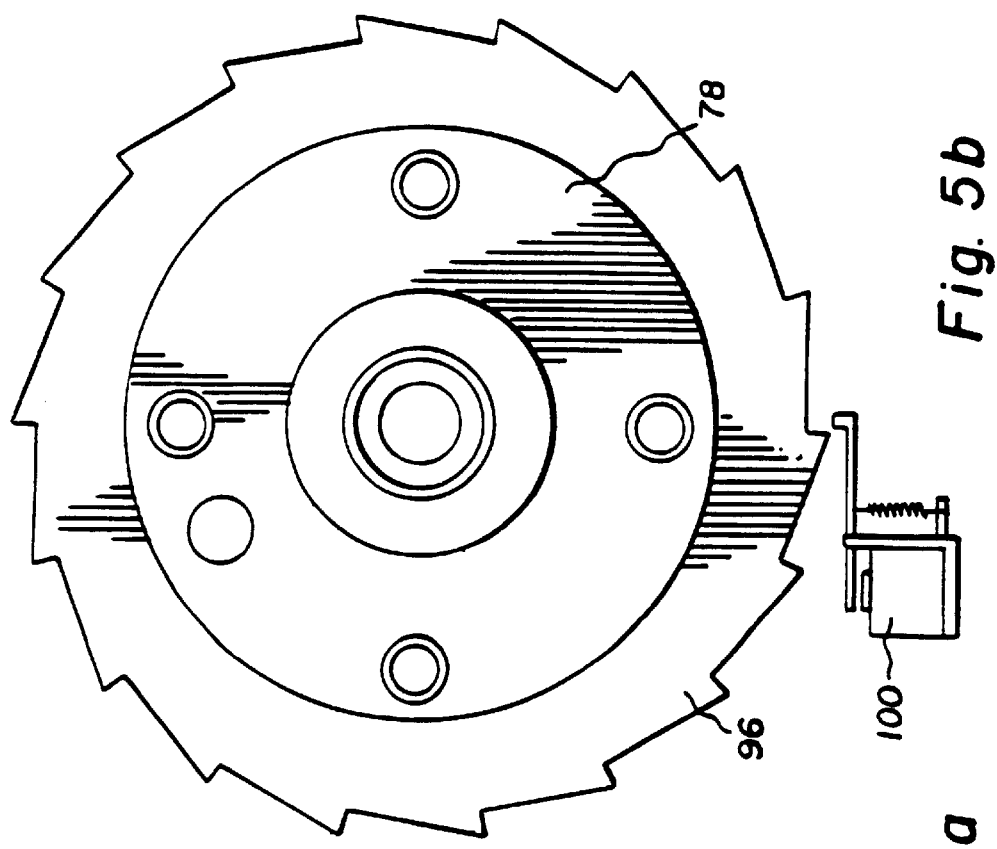
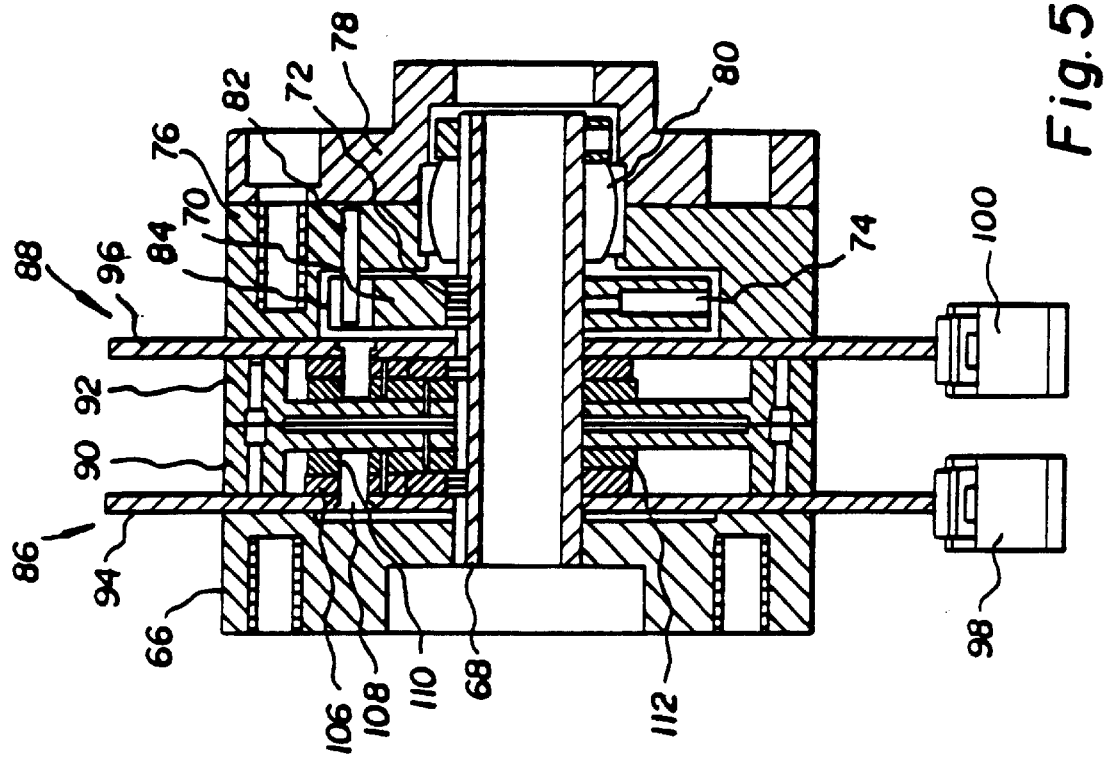

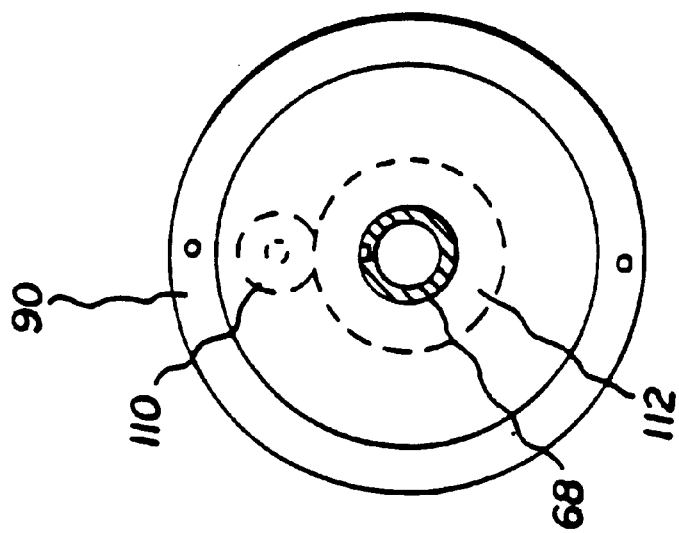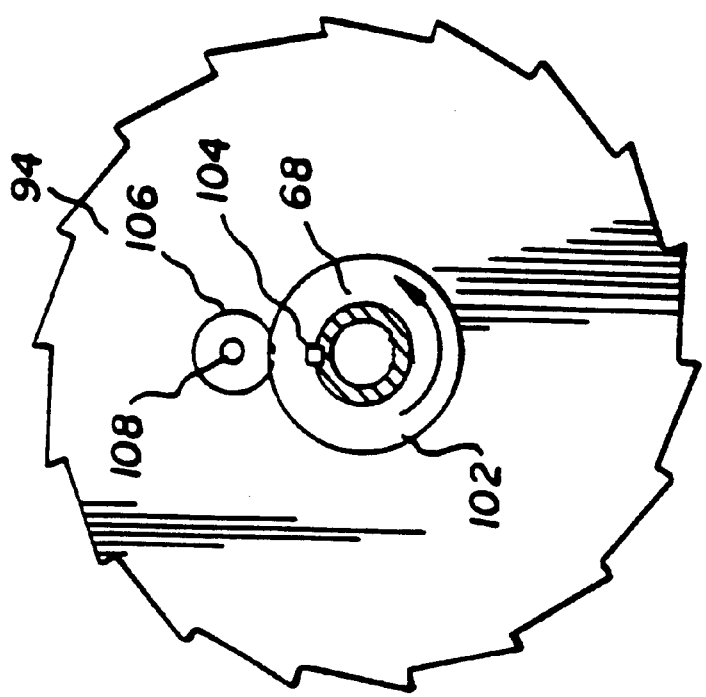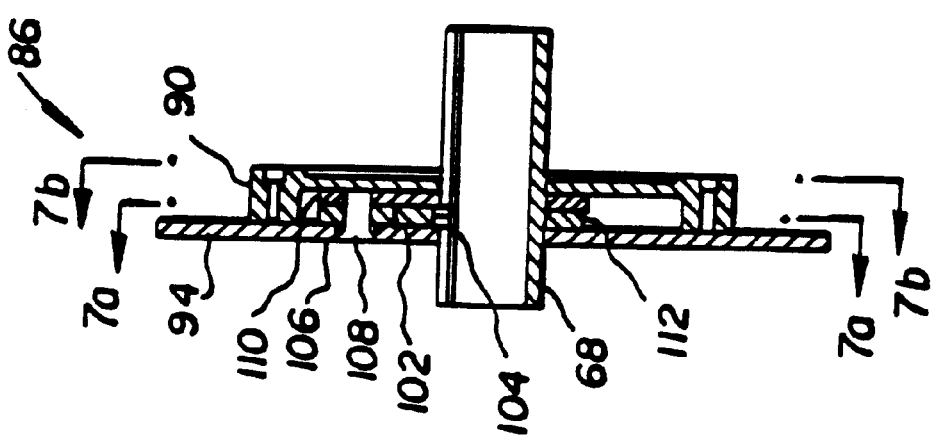

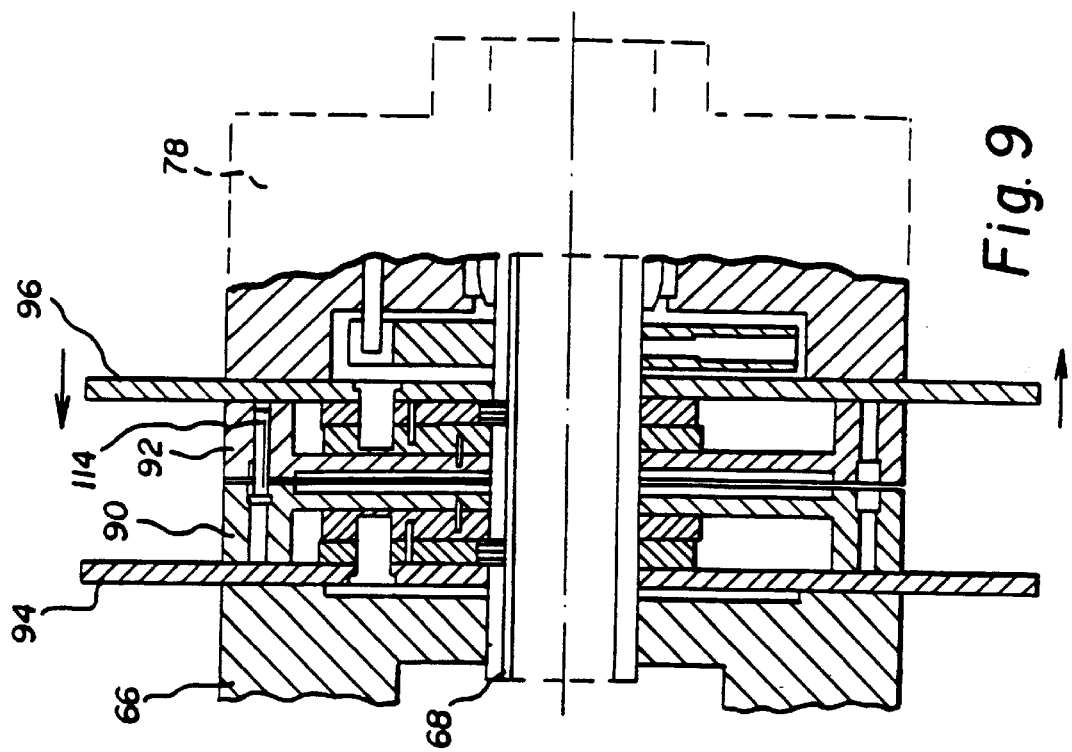
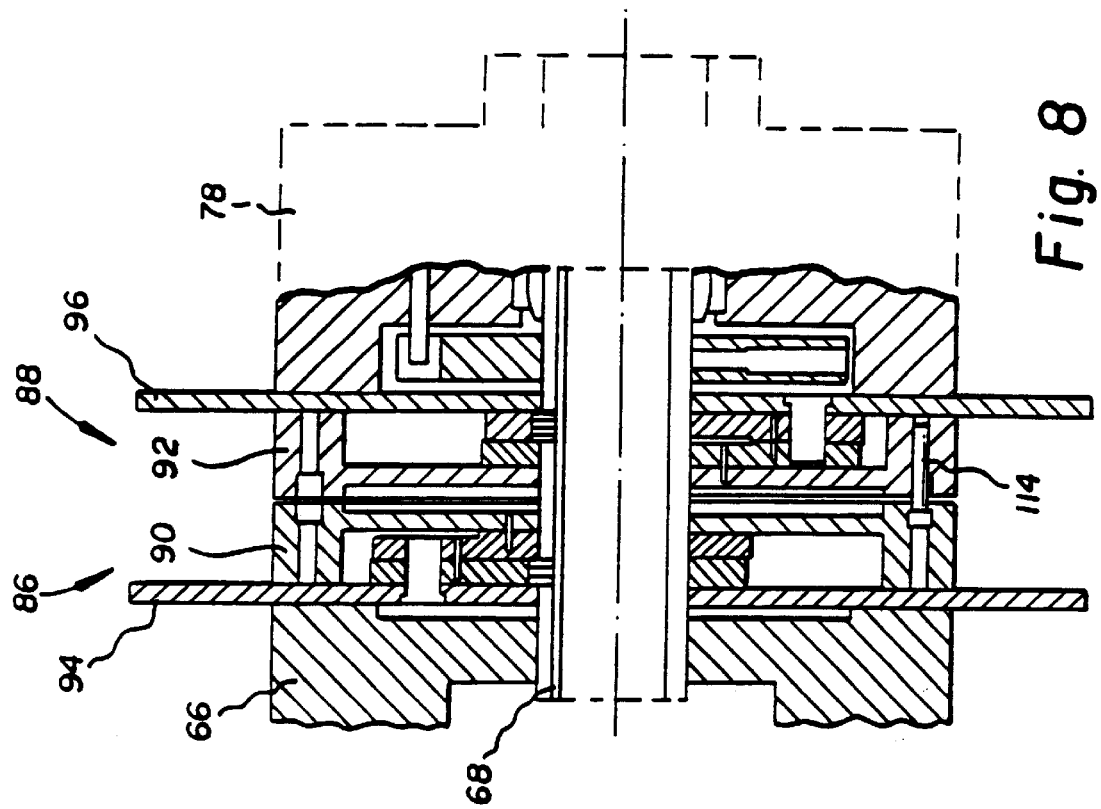

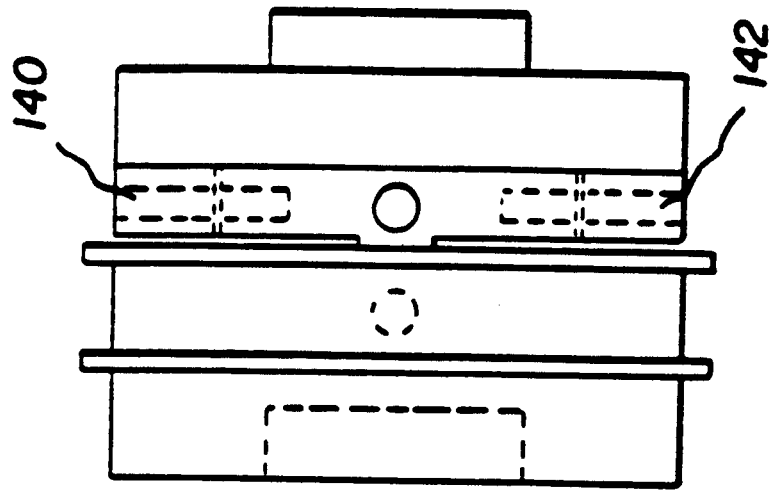
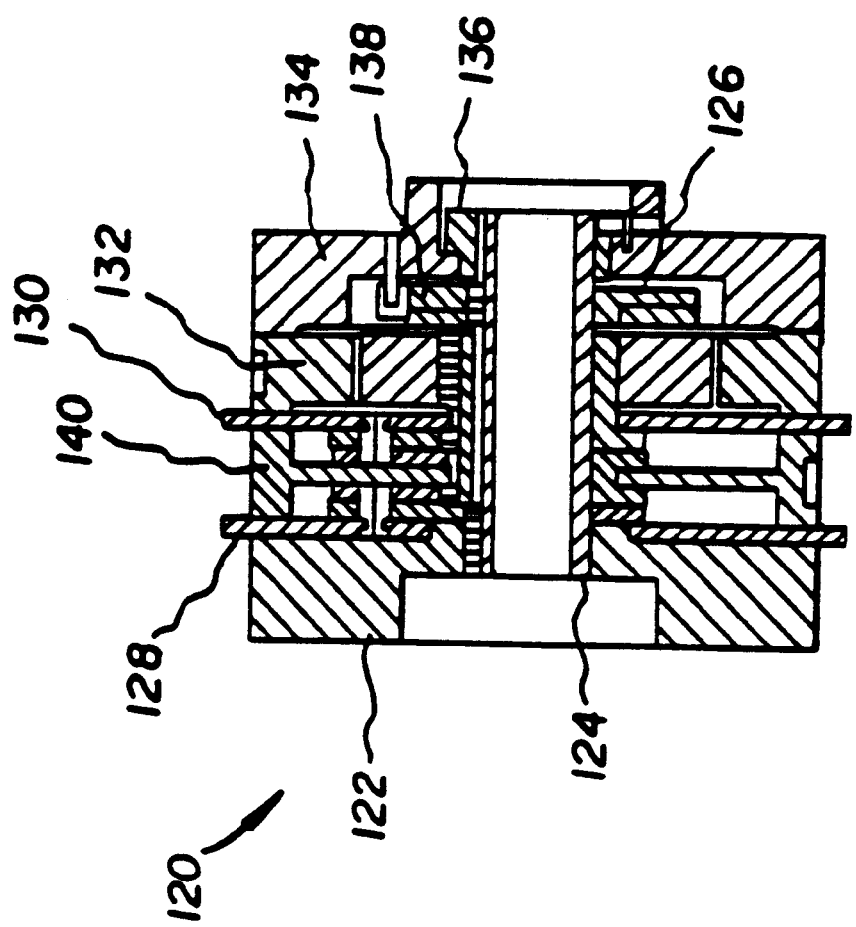
Fig. 10a
Fig. 10b

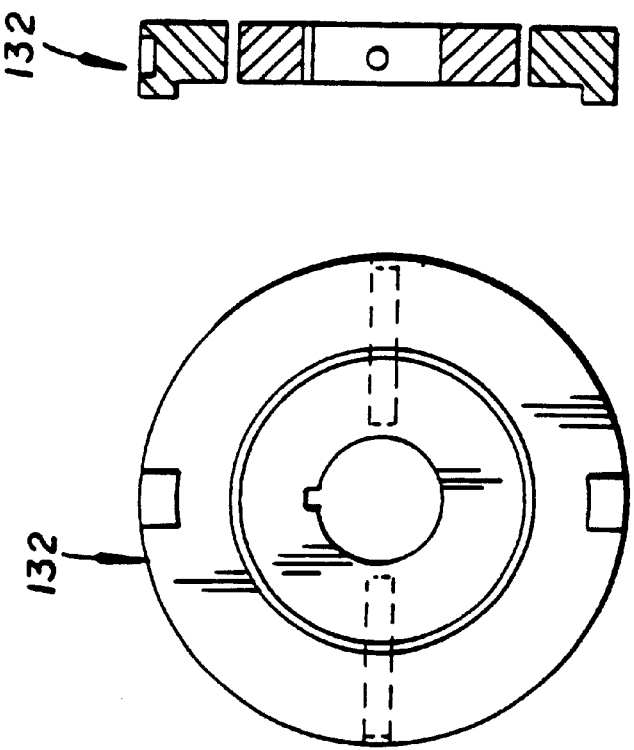
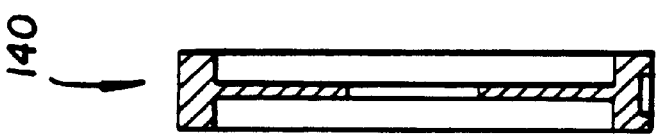
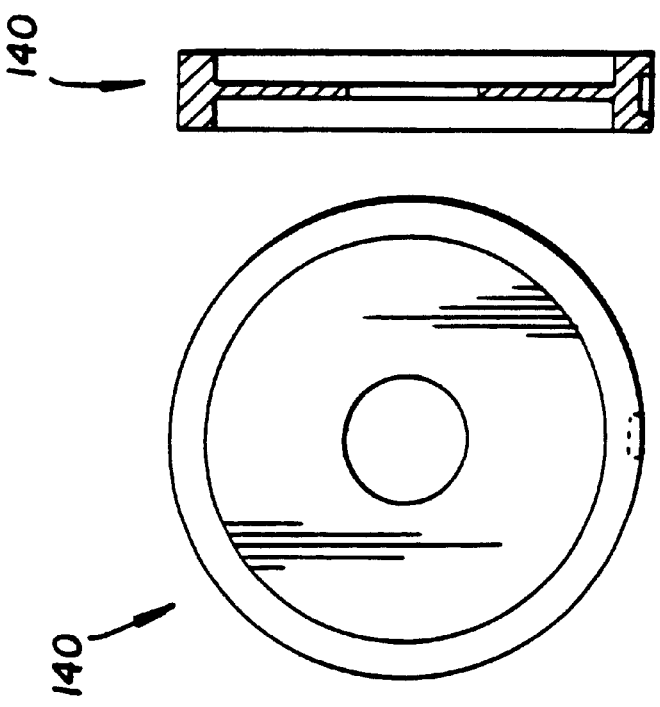

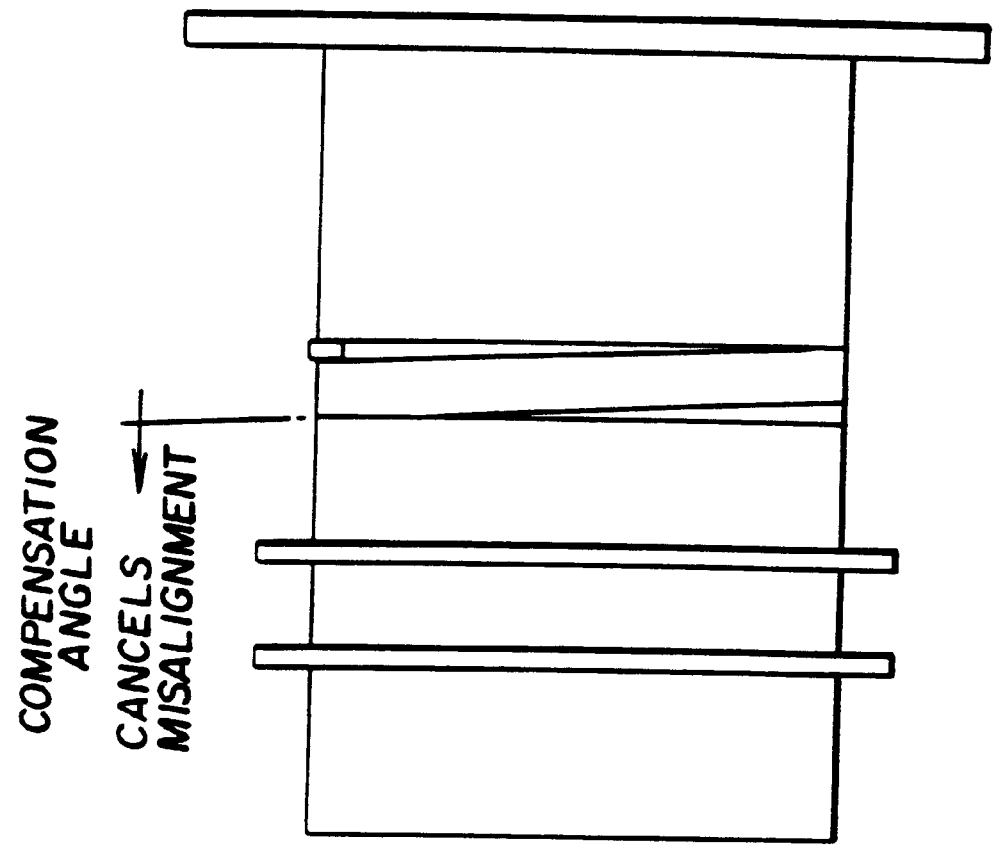
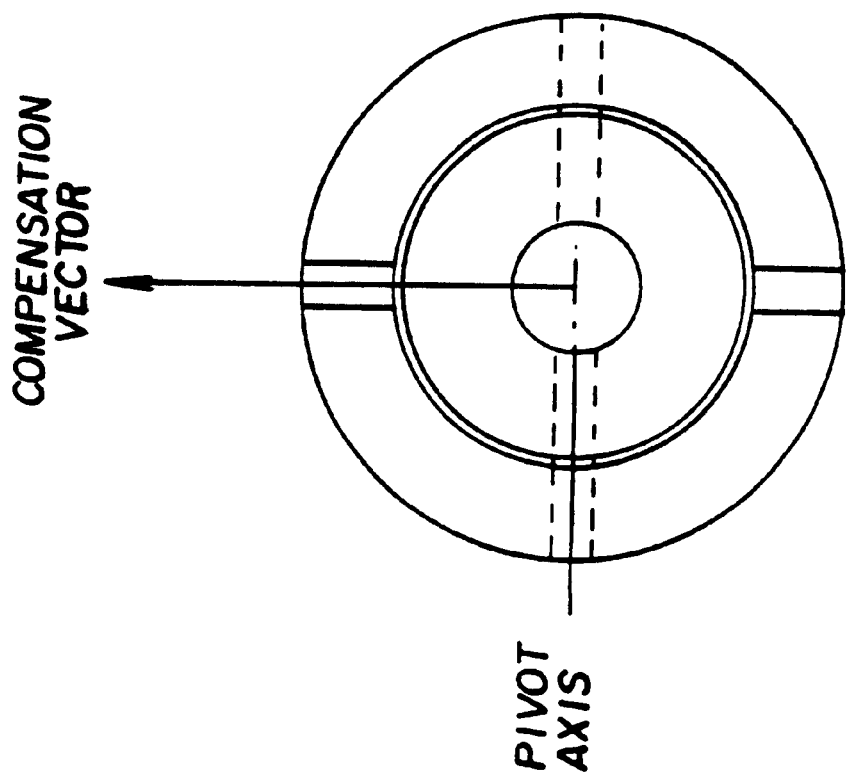
Fig. 11b
Fig. 11a

APPARATUS AND METHOD FOR AUTOMATICALLY COMPENSATING FOR LATERAL RUNOUT

CROSS-REFERENCE TO RELATED APPLICATIONS

This application is a continuation of U.S. Ser. No. 09/480,140, filed Jan. 10, 2000, which is a divisional of U.S. Ser. No. 08/706,514, filed Sep. 4, 1996, which issued as U.S. Pat. No. 6,050,160 on Apr. 18, 2000. These applications are incorporated by reference.

BACKGROUND OF THE INVENTION

This invention relates to an improved on-car brake lathe apparatus. More specifically, this invention relates to an apparatus and method for automatically compensating for the lateral runout of a lathe apparatus with respect to a vehicle hub. The invention further includes a novel runout measurement and control system that describes the runout of a disc brake assembly and directs a corrective signal to an automated control system for adjustment in order to effectively compensate of lateral runout. The novel runout apparatus and method may also be advantageously utilized in other practical applications in order to align two concentrically attached rotating shafts.

A brake system is one of the primary safety features in every road vehicle. The ability to quickly decelerate and bring a vehicle to a controlled stop is always critical to the safety of the vehicle occupants and those in the immediate vicinity. In this, a vehicle braking system is designed and manufactured to exacting specifications and rigorous inspection.

One of the main components of a brake system are the disc brake assemblies typically mounted on the front wheels of most passenger vehicles. Generally, the disc brake assemblies include a caliper (cooperating with a brake hydraulic system), brake pads, a hub, and a rotor. The caliper supports and positions a pair of brake pads on opposing sides of a brake rotor. In a hubless brake rotor (i.e. when the rotor and hub are separate components), the rotor is secured to the vehicle hub, via a rotor hat, with a series of bolts for rotation with the hub about a vehicle spindle axis. When a vehicle driver depresses a brake pedal thereby activating the hydraulic system, the brake pads are forced together and toward the rotor to grip the friction surfaces of the rotor.

Disc brake assemblies must be maintained to manufacturers specifications throughout the life of the vehicle in order to assure optimum performance and maximum safety. However, several problems have plagued the automotive industry since the inception of disc brakes.

A significant problem in brake systems is usually referred to as "lateral runout." Generally, lateral runout is the side-to-side movement of the friction surfaces of the rotor as it rotates with the vehicle hub about a spindle axis. Referring to FIG. 1, for example, there is shown a rotor having friction surfaces on its lateral sides. A rotor is mounted on a vehicle hub for rotation about the horizontal spindle axis X. In an optimum rotor configuration, the rotor is mounted to rotate in a plane Y that is precisely perpendicular to the spindle axis X. Generally, good braking performance is dependant upon the rotor friction surfaces being perpendicular to the spindle's axis of rotation X and parallel to one another ("parallelism"). In the optimum configuration, the opposing brake pads will contact the friction surfaces of the rotor at perfect 90 degree angles and will exert equal pressure on the rotor as it rotates. More typically, however, the disc brake assembly will produce at least a degree of lateral runout that deviates from the ideal configuration. For example, a rotor will often rotate in a canted plane Y' and about an axis X' which is a few thousandths of an inch out of axial alignment with the spindle (shown in exaggerated fashion in FIG. 1). In this rotor configuration, the brake pads, which are perpendicular to the spindle axis X, will not contact the friction surfaces of the rotor along a constant pressure plane.

The lateral runout of a rotor is the lateral distance that the rotor deviates from the ideal plane of rotation Y during a rotation cycle of the rotor. A certain amount of lateral runout is inherently present in the hub and rotor assembly. This lateral runout often results from defects in individual components. For example, rotor friction surface runout results when the rotor friction surfaces are not perpendicular to the rotor's own axis of rotation, rotor hat runout results when the hat connection contains deviations that produce an off center mount, and stacked runout results when the runouts of the components are added or "stacked" with each other. An excessive amount of lateral runout in a component or in the assembly (i.e. stacked runout) will generally result in brake noise, pedal pulsation, and a significant reduction in overall brake system efficiency. Moreover, brake pad wear is uneven and accelerated with the presence of lateral runout. Typically, manufacturers specify a maximum lateral runout for the friction surfaces, rotor hat, and hub that is acceptable for safe and reliable operation.

After extended use, a brake rotor must be resurfaced in order to bring the brake assembly within manufacturers specifications. This resurfacing is typically accomplished through a grinding or cutting operation. Several prior art brake lathes have been used to resurface brake rotors. These prior art lathes can be categorized into three general classes: (1) bench mounted lathes; (2) on-car caliper-mounted lathes; and (3) on-car hub mounted lathes. As discussed below, the on-car hub mounted lathes have proven to be the most reliable and accurate rotor refinishing lathes in the industry.

Bench mounted lathes, for example, that disclosed in U.S. Pat. No. 3,540,165 to Lanham, are inefficient and do not have rotor matching capabilities. In order to resurface a rotor on a bench mounted lathe, the operator is first required to completely remove the rotor from the hub assembly. The operator then mounts the rotor on the bench lathe using a series of cones or adapters. After the cutting operation, the operator remounts the rotor on the vehicle spindle. Even if the rotor is mounted to the lathe in a perfectly centered and runout free manner, runout between the rotor and hub is not accounted for in the bench lathe resurfacing operation. In addition, bench lathes are susceptible to bent shafts which introduce runout into a machined rotor. This runout is then carried back to the brake assembly where it may be added with hub runout to produced a stacked runout effect.

Similarly, caliper-mounted lathes, for example, that disclosed in U.S. Pat. No. 4,388,846 to Kopecko et al., have had limited success in compensating for lateral runout, but require time consuming manual operations. During a rotor refinishing procedure, the brake caliper must first be removed in order to expose the rotor and hub. Once removed, the caliper mounting bracket is freed and can be used to mount an on-car caliper-mount lathe. The caliper-mount lathes are wholly unacceptable for many reasons including the lack of a "rigid loop" connection between the driving motor and cutting tool and the inability to assure a perpendicular relationship between the cutting tools and the rotor. Moreover, the caliper-mount lathes do not have any reliable means for measuring and correcting lateral runout. Typically and in much the same manner as described below with reference to the hub mounted lathes, a dial indicator is utilized in determining the total amount of lateral runout in the disc assembly. This measurement technique is problematic in terms of time, accuracy and ability of automechanics to comfortably use the equipment.

On-car hub mounted lathes, for example, that disclosed in U.S. Pat. No. 4,226,146 to Ekman, assigned to the assignee of the instant application, and incorporated by reference into the disclosure herein, have proven to be the most accurate and efficient means for resurfacing the rotor.

Referring now to FIG. 2, there is shown an Ekman type on-car disc brake lathe 10 for mounting to the hub of a vehicle 14. The lathe 10 includes a body 16, driving motor 18, adapter 20, and cutting assembly 22. The lathe is also provided with a stand and anti-rotation post (not shown), either of which can be used to counter the rotation of the lathe during a resurfacing operation. After the brake caliper is removed, the adapter 20 is secured to the hub of the vehicle 14 by using the wheel lug nuts. The lathe body 16 is then mounted to the adapter 20.

At this point in the prior art procedure, the operator must determine the total amount of lateral runout and make an appropriate adjustment. Specifically, the operator first mounts a dial indicator 26 to the cutting head 22 using a knob 28. The dial indicator 26 is positioned to contact the vehicle 14 at one of its distal ends as shown in FIG. 2. Once the gauge 26 is properly positioned, the operator is required to take the following steps in order to measure and compensate for lateral runout:

(1) The operator mates the lathe to the rotor using the adapter and procedure outlined above.

(2) The operator activates the lathe motor 18 which causes the adapter 20, and thereby the brake assembly hub and rotor, to rotate. The total lateral runout of the assembly will be reflected by corresponding lateral movement in the lathe body.

(3) The lateral movement of the lathe body is then quantified by using the gauge 26. Specifically, the operator observes the dial indicator to determine the high and low deflection points and the corresponding location of these points on the lathe.

(4) Upon identifying the highest deflection of the dial indicator, the operator "bumps" the motor and stops the rotation at the point of the identified highest deflection.

(5) The operator then makes an adjustment to compensate for runout of the assembly. This is accomplished by careful turning of the adjustment screws 24. Specifically, there are four adjustment screws and the correct screw(s) must be turned depending on the location of the high point. The affect of turning the screws is to adjust the orientation of the lathe body with respect to the adapter 20 (and therefore the rotor and hub) to mechanically compensate for the runout of the assembly. The operator adjusts the screws until the highest deflection point is reduced by half as determined by reference to the dial indicator 26.

(6) The operator activates the lathe motor 18 and observes the dial indicator 26 to again identify the highest deflection of the dial. If the maximum lateral movement of the lathe body, as measured by the needle deflection, is acceptable (i.e. typically less than 3/1000) then mechanical compensation is complete and the lathe turning operation can commence. Otherwise, further measurement and adjustment will be necessary by repeating steps (1) to (6).

The cutting operation is then performed by adjusting the tool holder 22 and cutting tools 23, and setting the proper cutting depth.

Although the hub mounted on-car brake lathe was a considerable advance in the disc brake lathe industry, its structure and corresponding procedure for compensating for lateral runout of the disc brake assembly has practical limitations.

First, as readily apparent, upon observation of steps (1)–(6) above, the Ekman procedure requires a significant amount of time to determine and adjust for lateral runout of the brake assembly. Although the specific amount of time necessary will vary based upon operator experience, the procedure time for even the most trained and experience is significant and can substantially increase the cost associated with rotor refinishing to the vehicle owner and the shop. Second, the prior art system and procedure requires the shop owner and technicians to undergo extensive education and operator training in order to assure that proper mechanical compensation for lateral runout is accomplished. Moreover, the Ekman system is operator specific. That is, the accuracy and success of measurement and adjustment of lateral runout will vary from operator to operator.

In general, the prior art systems and procedures are problematic with respect to accuracy in the measuring and adjusting of lateral runout. The prior art systems require an operator to locate a high reading for lateral runout by viewing the gauge 26; often, the operator is required to "bump" the motor to relocate the high point once it has been identified. Moreover, even if the operator correctly locates and/or relocates the high point of lateral runout, human errors are often introduced during the adjustment process. For example, selecting the correct screw or screws 24 and applying the precise amount of torque necessary for adjustment is often difficult and imprecise.

The difficulties and limitations suggested in the preceding are not intended to be exhaustive, but rather are among many which demonstrate that although significant attention has been devoted to disc brake lathes, such systems will admit to worthwhile improvement.

OBJECTS AND BRIEF SUMMARY OF THE INVENTION

It is therefore a general object of the invention to provide a novel on-car disc brake lathe system which will obviate or minimize difficulties of the type previously described.

It is another general object of the invention to provide a novel runout measurement and control system for an on-car disc brake lathe that accurately detects and quantifies the runout of a lathe apparatus with respect to a vehicle hub assembly.

It is yet another general object of the invention to provide a novel automated alignment apparatus for an on-car disc brake lathe that adjusts the axial alignment of the lathe in accordance with information produced by a runout sensing and control system.

It is a specific object of the invention to provide a novel runout measurement and control system for an on-car disc brake lathe that directs a corrective signal to an automated control system for adjustment.

It is a specific object of the invention to provide a novel on-car disc brake lathe apparatus which eliminates the need for manual adjustment by an operator in order to compensate for lateral runout.

It is another specific object of the invention to provide a novel on-car disc brake lathe apparatus system which will accurately and consistently measure and adjust for runout.

It is still another specific object of the invention to provide a novel on-car disc brake lathe apparatus which will significantly reduce the time required for a complete brake disc lathing operation.

It is still yet another specific object of the invention to provide a runout measurement and control system for an on-car disc brake lathe having a processing unit for accurate and reliable data evaluation.

It is another specific object of the invention to provide a runout measurement and control system for an on-car disc brake lathe that advises an operator or directs an electrically controlled system to perform an axial alignment of the lathe and vehicle hub.

It is still another specific object of the invention to provide an automated alignment device for an on-car disc brake lathe that accurately adjusts the relative angle between the vehicle hub's axis of rotation and the lathe's drive shaft.

It is yet another specific object of the invention to provide an automated alignment apparatus for an on-car disc brake lathe that, when used with a suitable control system, will reduce the total lateral runout of the lathe with respect to the vehicle hub assembly to within acceptable manufacturing specifications.

It is further specific object of the invention to provide an automated alignment apparatus for an on-car disc brake lathe that is simple, accurate, capable of computer control, and low in cost.

It is another specific object of the invention to provide a runout measurement and control system for an on-car disc brake lathe that senses rotational accelerations while rejecting linear accelerations in any of the three dimensional axes.

It is another specific object of the invention to provide a runout measurement and control system for an on-car disc brake lathe that senses rotational that it is a one piece mechanism mounted securely to the lathe and not subject to operator error during setup.

SUMMARY OF THE INVENTION

The automatic alignment apparatus for an on-car disc brake lathe of the present invention which is intended to accomplish at least the foregoing objects includes a brake lathe having an automatic alignment coupling that operates in response to a corrective signal to adjust the alignment of the lathe with respect to the vehicle in order to mechanically compensate for lateral runout. The automatic alignment mechanism includes one or more stop discs that rotate with the drive shaft of the lathe and that can be selectively stopped from rotating with the shaft by a stop mechanism. In response to such stopping, one or more adjustment discs are caused to rotate in order to adjust the relative position of the axis of the lathe with respect to the axis of the disc brake assembly. In this manner, the system compensates for and corrects lateral runout that exists between two concentrically attached rotating shafts.

DRAWINGS

Other objects and advantages of the present invention will become apparent from the following detailed description of the invention, taken in conjunction with the accompanying drawings, wherein:

FIGS. 5a and 5b are cross-sectional and front views, respectively, of the automatic alignment apparatus of the first preferred embodiment of the present invention.

FIG. 6 is a cross-sectional view of the adjustment disc assemblies of the automatic alignment apparatus of the first preferred embodiment of the present invention.

FIGS. 7a and 7b are front cross-sectional views of one of the adjustment disc assemblies of the automatic alignment apparatus of the first preferred embodiment of the present invention.

FIGS. 8 and 9 are cross-sectional views of the adjustment disc assemblies of the automatic alignment apparatus of the first preferred embodiment of the present invention.

FIGS. 10a and 10b are cross-sectional and side views, respectively, of the automatic alignment apparatus of the second preferred embodiment of the present invention.

FIG. 10c is a front and cross-sectional views of an adjustment disc of the automatic alignment apparatus of the second preferred embodiment of the present invention.

FIG. 10d is a front and cross-sectional views of a slant disc of the automatic alignment apparatus of a pivot ring of the second preferred embodiment of the present invention.

FIGS. 11a and 11b are schematic representations of the compensation vector and compensation alignment angle of the automatic alignment apparatus of the second preferred embodiment of the present invention.

FIGS. 15a–g is a timing diagram of the starwheel stop operation of the automatic alignment apparatus of the third preferred embodiment of the present invention.

Figure 16:
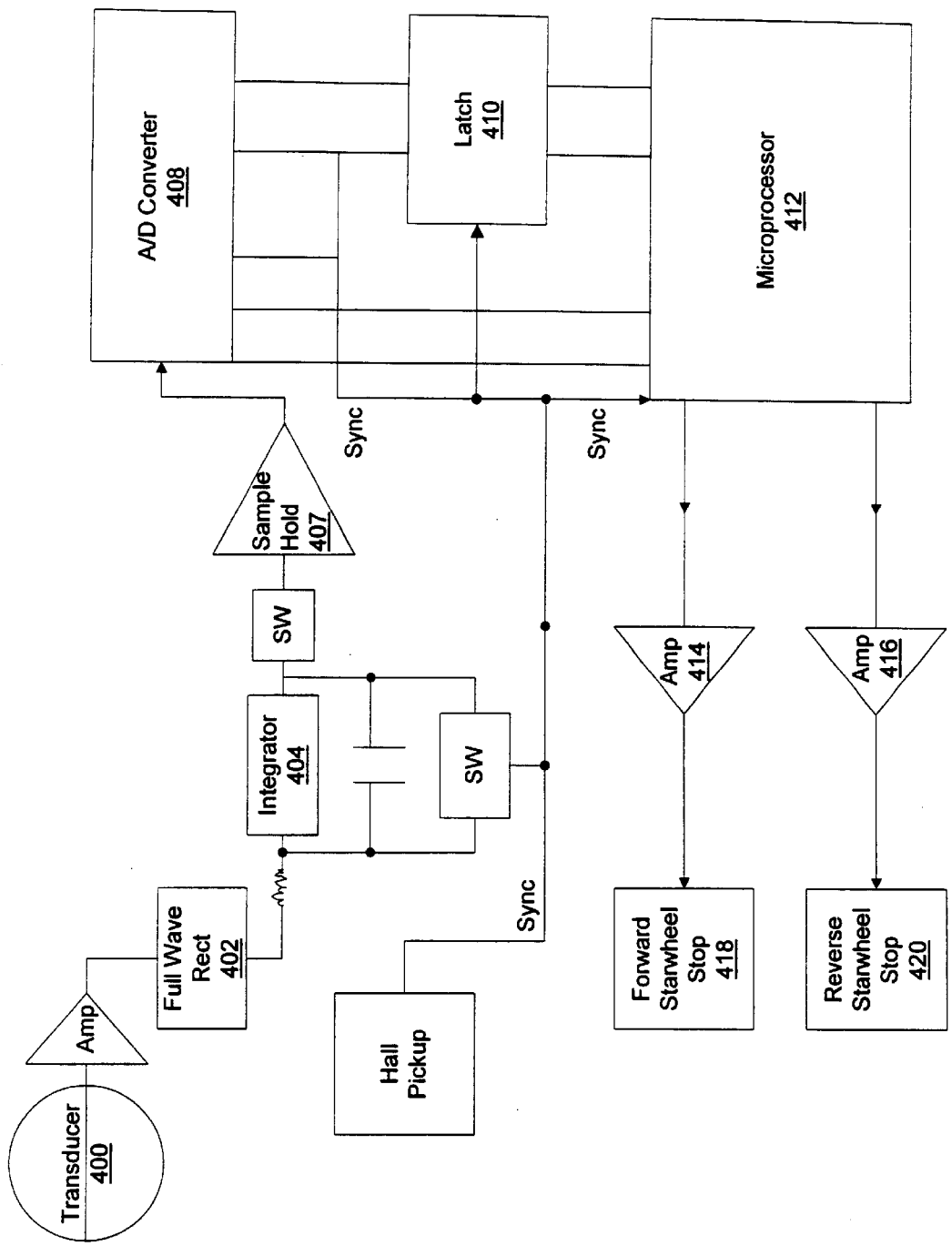

FIG. 16 is a flow diagram of the automatic alignment operation utilizing the automatic alignment apparatus of the third preferred embodiment of the present invention.

Figure 17:
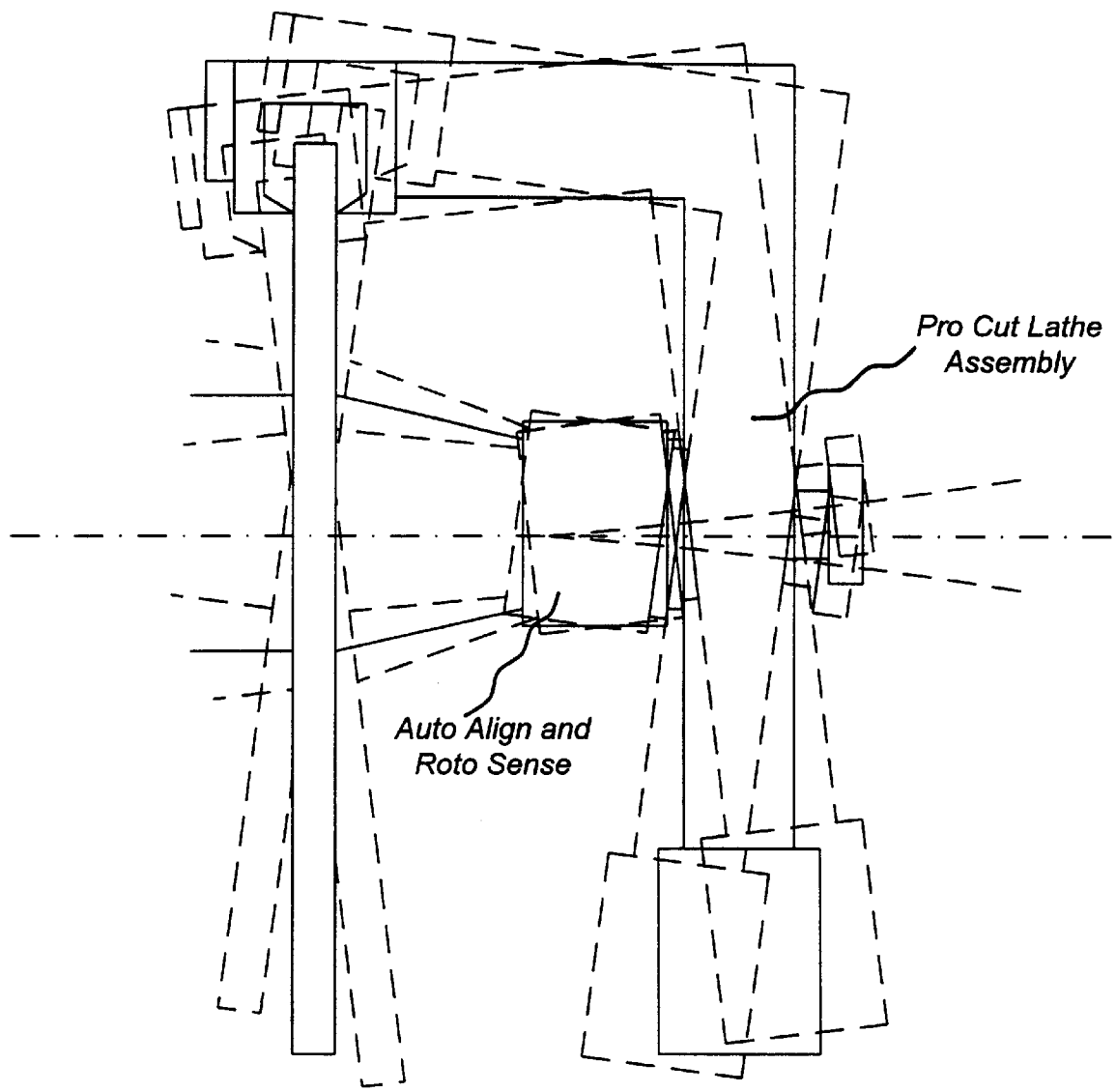

FIG. 17 is a schematic view of the rotational runout phenomenon occurring during a cutting operation of the on-car disc brake lathe mounted on the hub of a vehicle.

Figure 18:
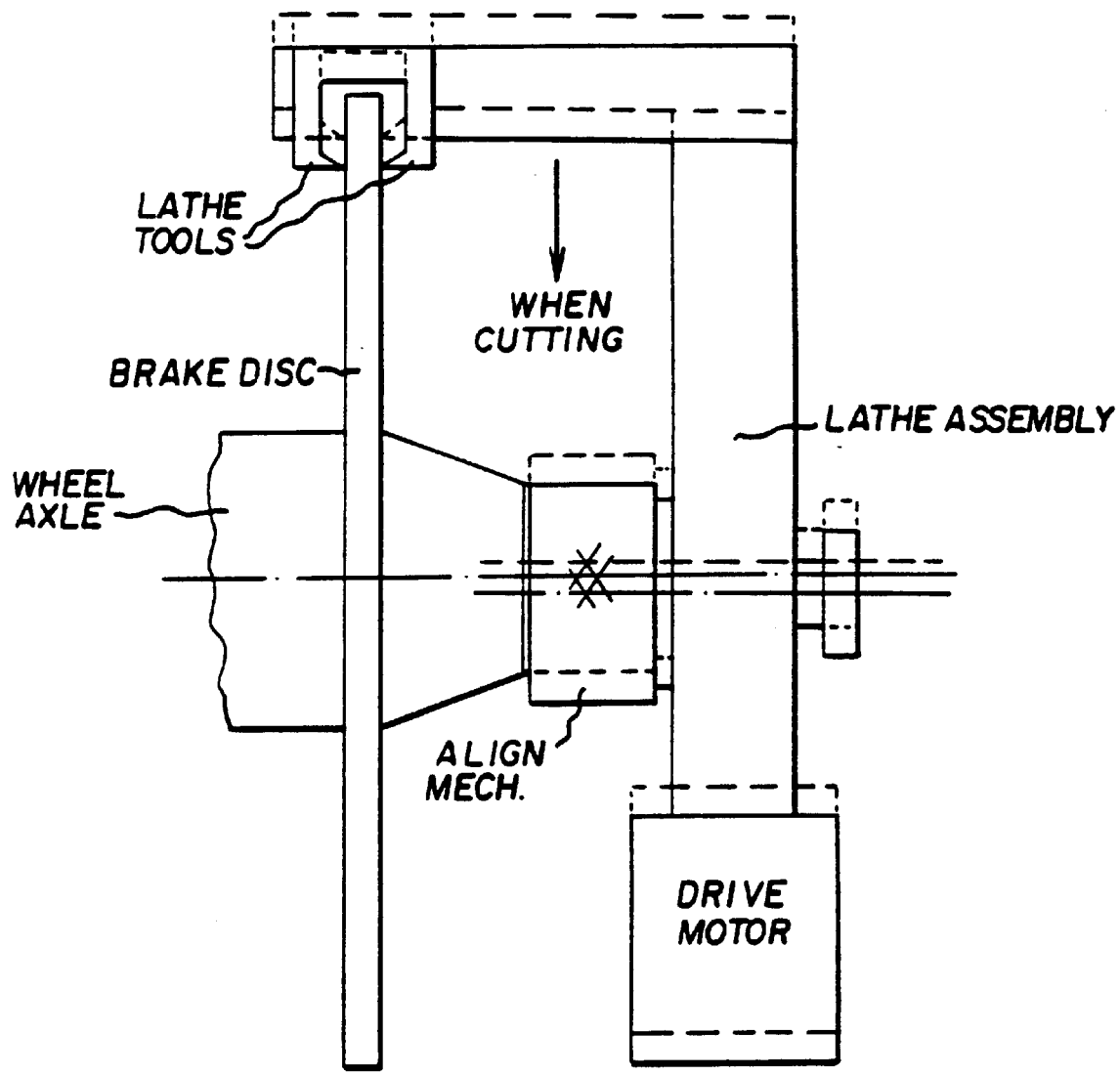

FIG. 18 is a schematic view of the linear runout phenomenon occurring during a cutting operation of the on-car disc brake lathe mounted on the hub of a vehicle.

Figure 19B:
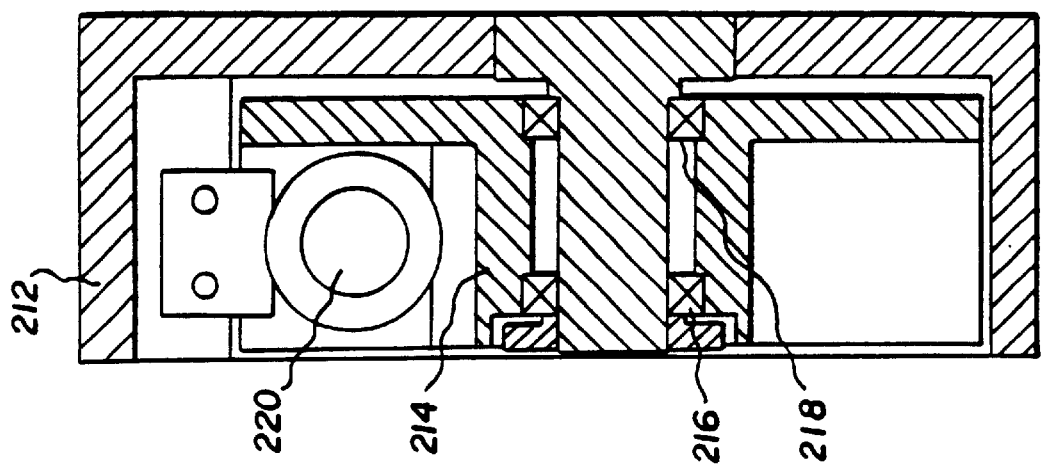
Figure 19A:
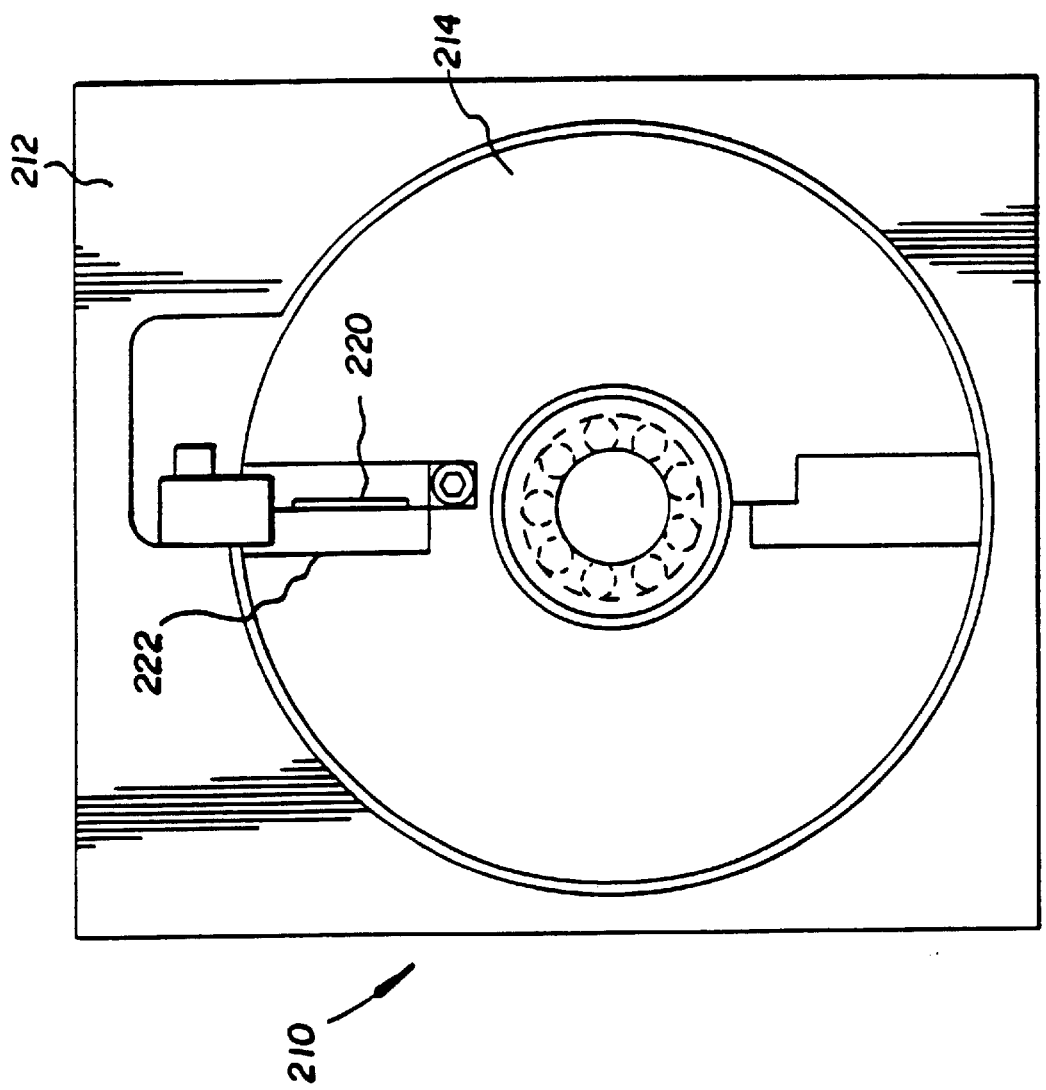

FIGS. 19a and 19b are front and cross-sectional views, respectively, of a rotary piezo-electric accelerometer of the runout measurement and control system of the of the present invention.

Figure 20:
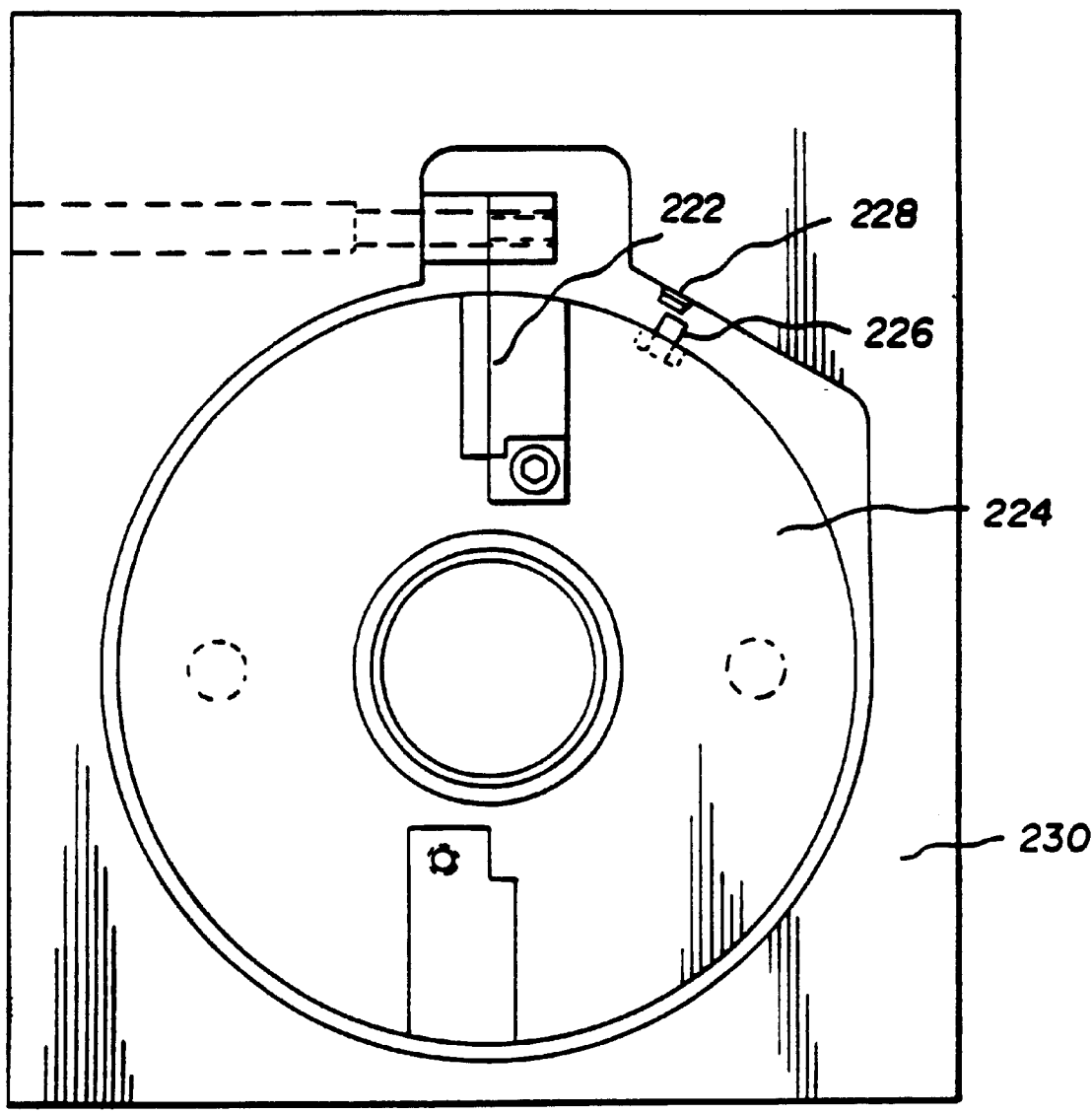

FIG. 20 is a front view of a rotary magnetic hall effect transducer of the runout measurement and control system of the of the present invention.

Figure 21:
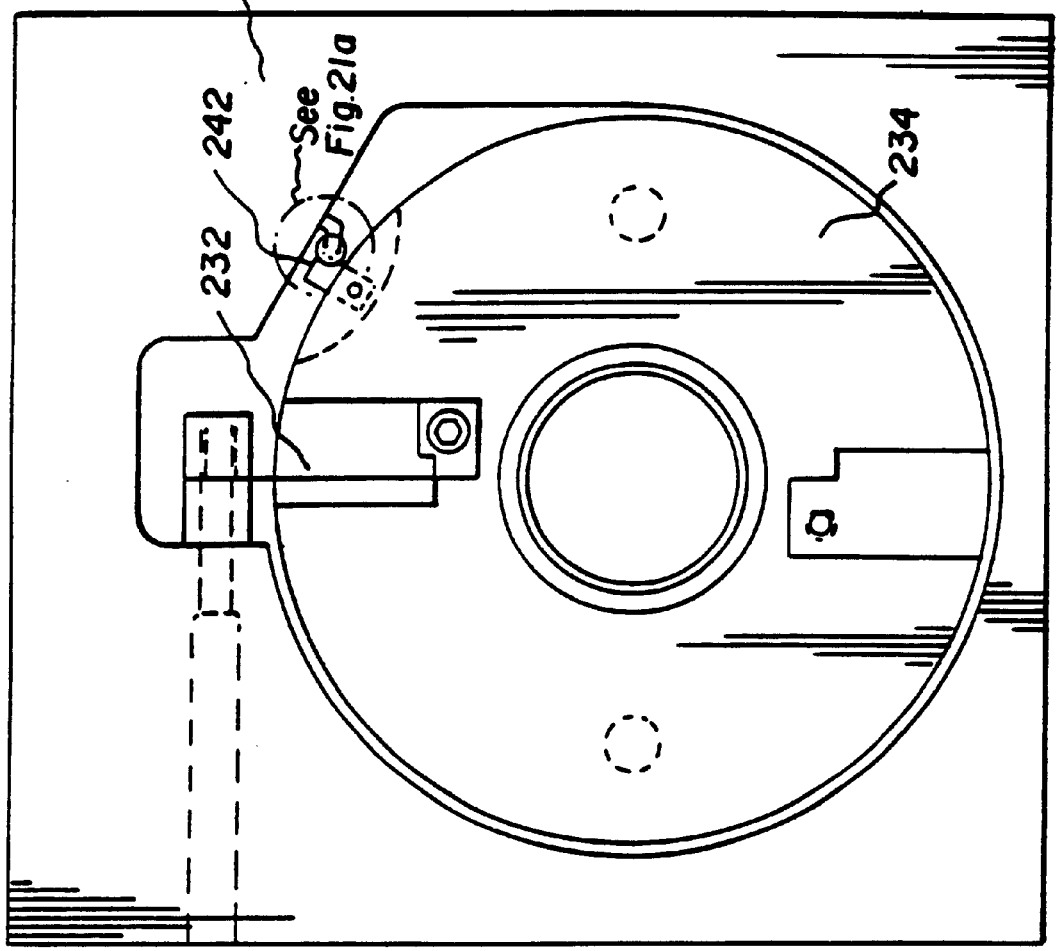

FIGS. 21 and 21a are front and side views of a rotary infrared generator accelerometer of the runout measurement and control system of the of the present invention.

Figure 22:
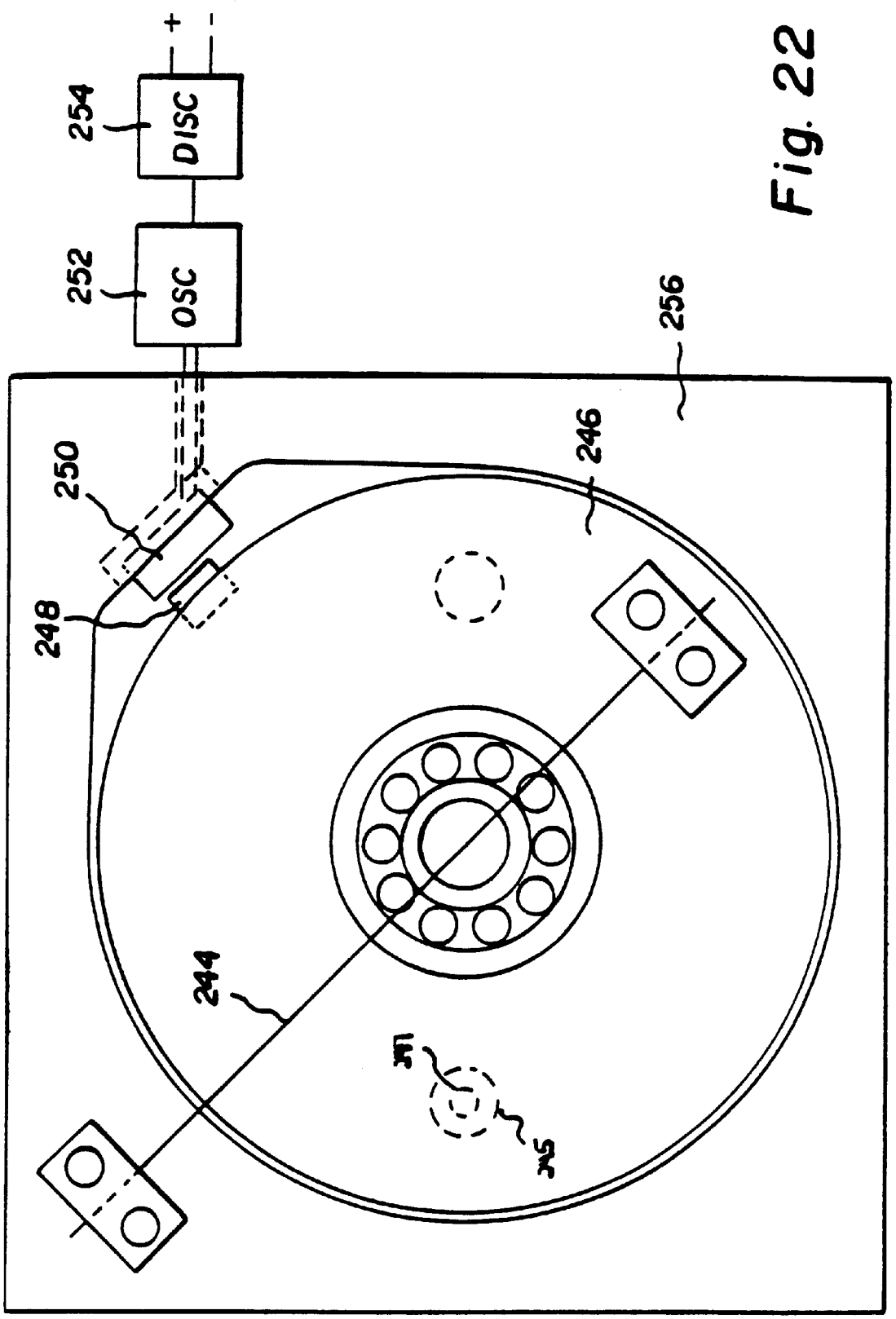

FIG. 22 is a front view of a rotary tuned coil oscillator accelerometer of the runout measurement and control system of the of the present invention.

Figure 23:
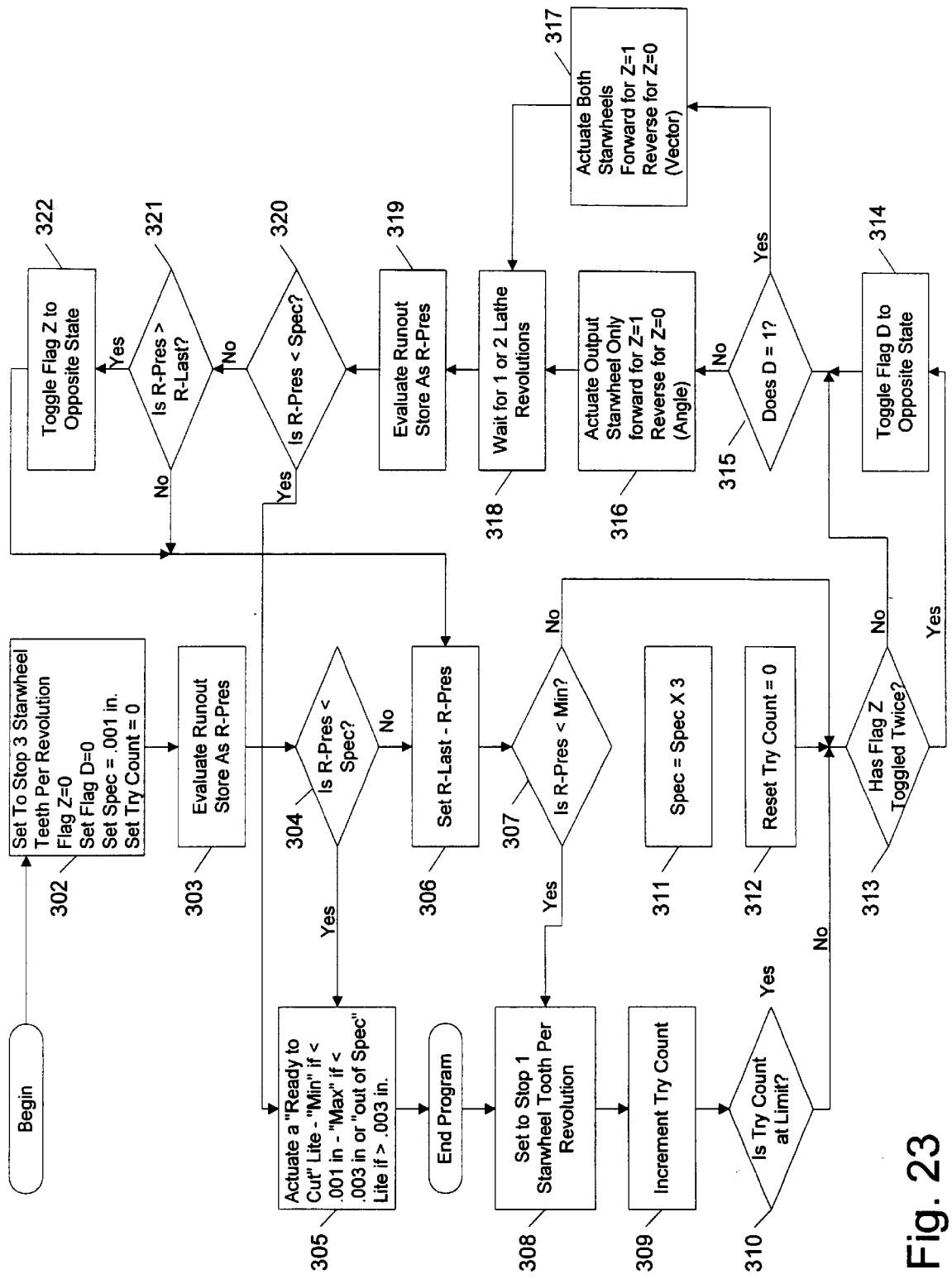

FIG. 23 is a circuit diagram of the control system of the runout measurement and control system of the of the present invention.

DETAILED DESCRIPTION

Context of the Invention

Figure 1:
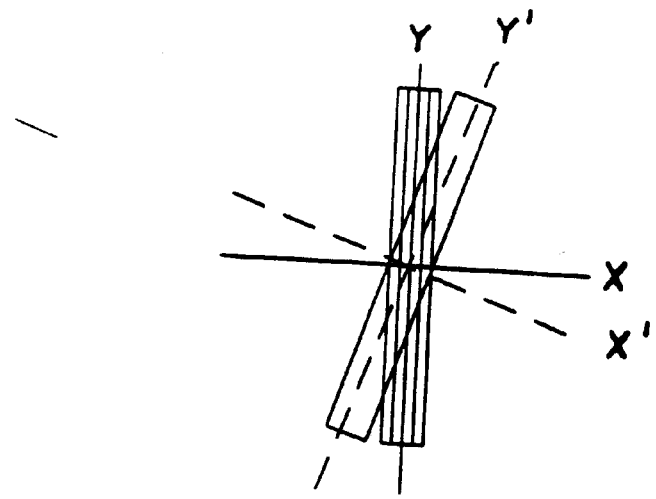
FIG. 1 is a graphical representation of a lateral runout phenomenon.
Figure 2:
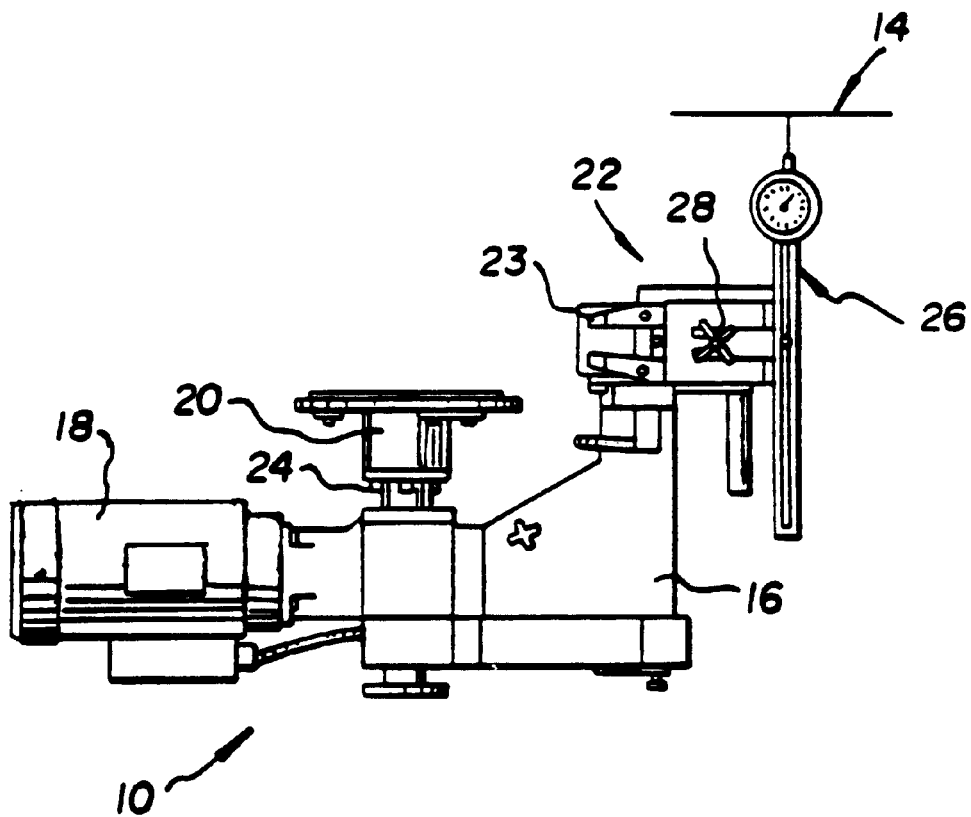
FIG. 2 is a plan view showing an on-car disc brake lathe and depicting a prior art procedure for measuring, and compensating for lateral runout of a disc brake assembly.
Figure 3:
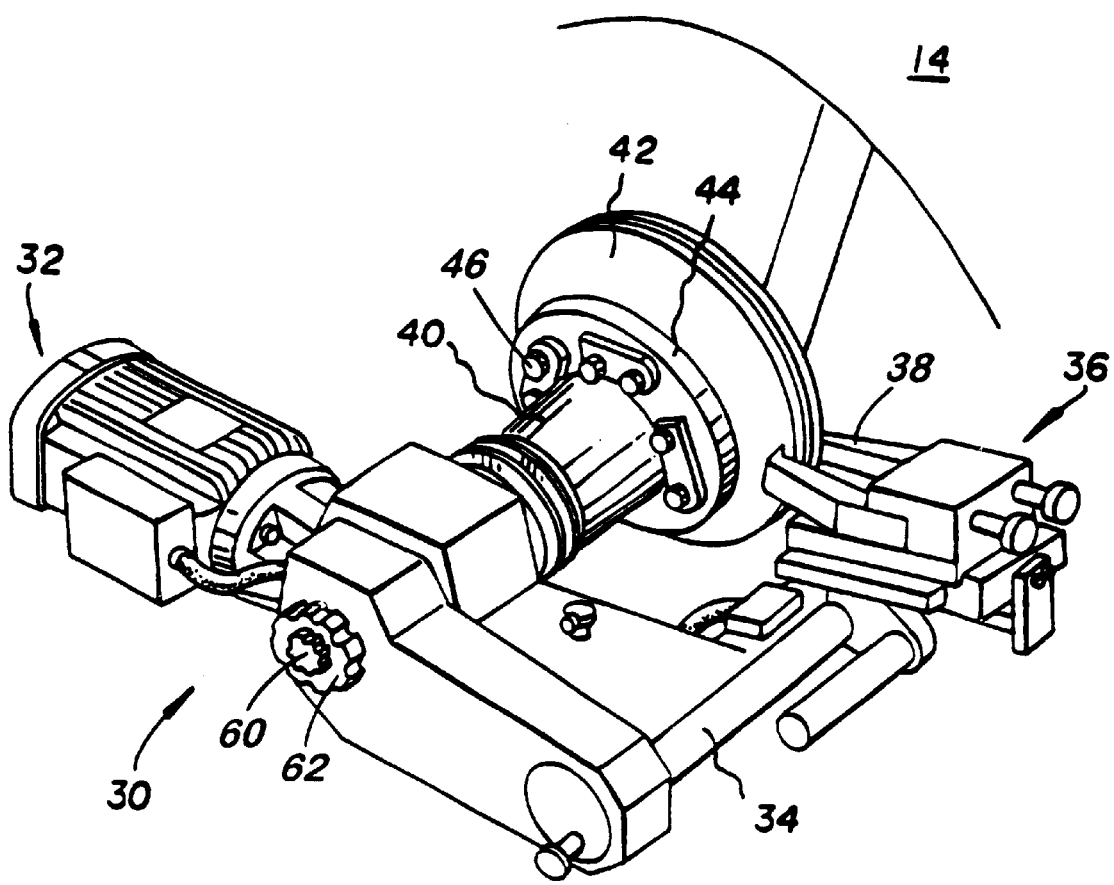
FIG. 3 is a perspective view showing an on-car disc brake lathe mounted on the hub of a vehicle in preparation for a disc resurfacing operation in accordance with the present invention.

Referring now to FIG. 3, there is shown a perspective view of an on-car disc brake lathe 30 of the present invention mounted to a hub 44 of a vehicle 14 brake assembly. The disc brake lathe 30 includes a motor 32, body 34, cutting head 36 with cutting tools 38, and adapter 40. The vehicle disc brake assembly includes a rotor 42 operably attached to a hub 44. Typically, the attachment of the rotor 42 to the hub is through a rotor hat (not shown) formed in the rotor 42 (i.e. a "hubless" rotor). However, an integral rotor and hub is occasionally utilized in commercial vehicles. The adapter 40 is mounted to the hub 42 of the vehicle utilizing the lug nuts 46.

Apparatus and Method for Automatic Runout Compensation

Figure 4:
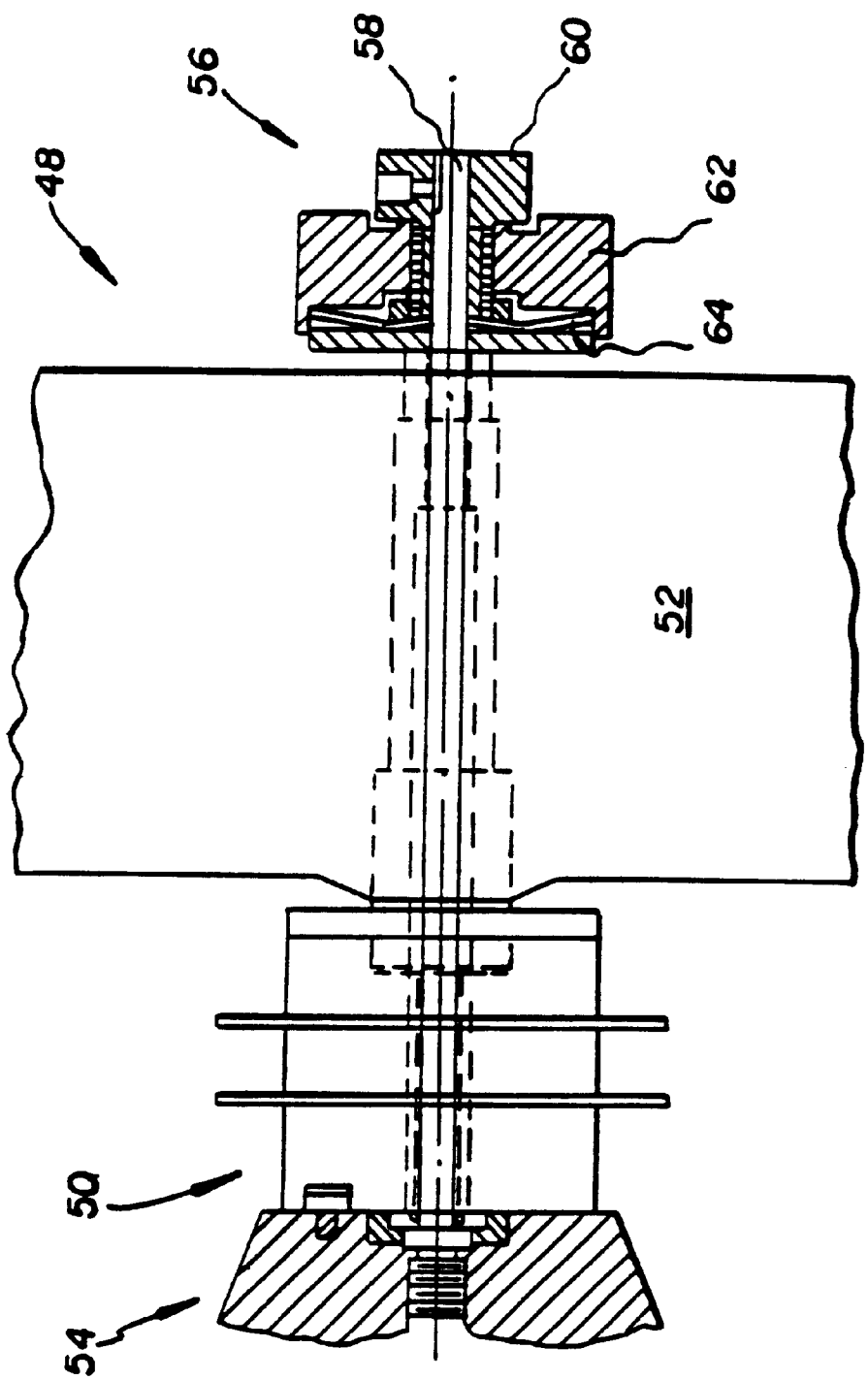
FIG. 4 is a partially sectional schematic view of a disc brake lathe with an automatic alignment apparatus of the first preferred embodiment of the present invention mounted on the hub of a vehicle.

The novel on-car disc brake lathe with automatic alignment and compensation mechanism of the subject invention is now described with reference to FIGS. 4 through 9. Referring to FIG. 4, there is shown a lathe 48 having an automatic alignment mechanism 50, lathe housing or body 52, hub adaptor 54, and drawbar assembly 56. The drawbar assembly includes a drawbar 58 that extends through the body 52 and alignment mechanism 50 and is operably connected to the adaptor 54 by a threaded connected (as shown) or the like. A calibrate knob 60 is tightened during the automated alignment sequence of the lathe and after alignment is complete, a run knob 62 is tightened for the cutting operation. Spring 64 is a belleville washer that provides a loading force on bar 58 which in turn runs through the components of the lathe.

Referring to FIG. 5a there is shown a cross-sectional view of the auto alignment coupling 50 of the preferred embodiment. An input adaptor 66 is operably attached to a rotating drive shaft of the lathe machine (shown in phantom in FIG. 4). Shaft 68 is attached to the input adaptor 66 such that the adaptor 66 mounting face is perpendicular to the shaft 68 axis so that shaft 68 runs true with the lathe machine axis.

Two slant or adjustment disc assemblies 86 and 88 are provided to be interposed between the input adaptor 66 and an alignment drive disc 70 which is attached to the shaft 68 and caused to rotate with it by a key 72 and set screw 74. A pivot plate 76 is operably attached to an output adaptor 78 and mounted to the shaft 68 by spherical bearing 80 so that the pivot plate 76 can pivot in relation to shaft 68 while being constrained from radial movement.

A pin 82, inserted into pivot plate 76, fits into a slot 84 at the periphery of the drive disc 70 and causes the pivot plate 76 to be rotationally coupled to the shaft 68 and input the adaptor 66. As such, when the input adaptor 66 is mounted on the lathe machine's drive shaft and the output adaptor 78 is mounted on the automobile brake disc adaptor 54, the lathe machine output rotation will cause the automobile brake disc adaptor to rotate, in turn causing the brake disc to rotate.

The slant or adjustment disc assemblies 86 and 88, which are mirrors of each other, are placed between the input adaptor 66 and the output adaptor 78 as shown. The axial force produced by the axially mounted drawbar 58, that mounts the output adaptor 78 to the automobile brake disc hub, causes the output adaptor 78 to be forced against slant disc assembly 88 and to assume an angle to the shaft 68 that depends upon the relative rotational positions of the slant disc 90 and 92.

Referring to FIG. 6, adjustment disc assemblies 90 and 92 are shown in parallel and in positions of maximum angular runout. Control of the relative position of the slant discs 90 and 92 is accomplished while the lathe machine output shaft is driving the automobile brake disc hub. Specifically, by stopping the rotation of stop disc 94 or 96, its associated slant disc is caused to rotate in relation to the other slant disc, thus producing a change in angle of the output of the adjustment disc assemblies 86 and 88, causing the angle of the output adaptor 78 to change in response. This causes a change in the angular alignment of the lathe machine axis and the automobile brake disc axis.

As shown in FIGS. 5a and 5b, the stop discs 94 and 96 are selectively stopped by powering a respective electromagnetic catch 98 and 100. The catches are controlled by an microprocessor system that operates in conjunction with a runout measurement and control mechanism described in more detail below. The lathe machine output shaft rotates at a speed that is too fast (for example, 123.14 RPM) to allow stop and release of a stop disc and associated slant disc for adjustment. As such, the rotation speed of the adjustment components is slowed by using a gear train contained in each of the slant disc assemblies. The gear train will extend the time permitted for adjustments in a given ½ revolution of the shaft 68 (i.e. the time it takes stop pin 114 to stop the relative rotation of the slant discs in ½ revolution for maximum angular runout adjustment). For example, the time will extend at 123.14 RPM shaft rotation from 0.243 seconds for ½ revolution of the shaft 68 to 3.297 seconds thereby permitting easy and complete adjustment of the slant disc assemblies 86 and 88.

Referring to FIGS. 6 and 7a, the preferred gearing mechanism comprises a gear 102 containing 88 teeth, and gear 102 is coupled with key 104 to rotate with shaft 68. Gear 106 contains 38 teeth and is mounted on a pivot 108 formed on stop disc 94. Thus, when stop disc 94 is stopped by the electromagnetic catch 98, gear 106 rotates at a much faster rate than shaft 68. For example, if shaft 68 rotates at 123.14 RPM, gear 105 rotates at 285.166 RPM. A gear 110, also mounted on pivot 108, is provided with 36 teeth and is pinned to gear 106 to rotate therewith. Gear 110 is coupled to a gear 112 that is provided with, for example, 90 teeth. As such, gear 112 rotates at 114.06 RPM, or 0.926X the rotational speed of shaft 11, rotating backwards in relation to shaft 68 and slant disc 92. Because slant disc 90 is pinned to gear 112, it also moves backwards in relation to shaft 68 thereby adjusting the relative position of the slant discs 90 and 92. The gear arrangement and stop discs of the present invention permits the adjustment of the slant disc assemblies, and therefore, the alignment of the lathe drive axis and the hub axis, without the need for a separate motor or power source. It is to be understood that the identified gear ratios and rotation speeds are practical examples and are not intended to limit the scope of the invention hereof. When the stop disc 94 is released, it and slant disc 90, in its new position, again rotates at the rate of the shaft 68.

A stop pin 114 secured to slant disc 92 stops the relative rotation of the slant discs at ½ revolution, with stop disc 94 being parallel with stop disc 96 at one extreme to maximum angular runout at the other extreme. Specifically, by stopping the rotation of both stop discs 94 and 96, adjustment disc 90 and 92 remain fixed in relation to each other. Stopping the rotation of stop disc 94 alone until stop pin 114 couples to slant disc 90 causes stop disc 96, and thus output adaptor 78, to assume the maximum angular runout position.

Referring to FIG. 8, the adjustment disc assemblies 86 and 88 and associated adjustment discs 90 and 92 are rotated in relation to each other so that the "slant" or wedge on respective interfaces complement each other and the input surface of the assembly is parallel with the output surface. This is accomplished by stopping the stop disc 94 until the pin 114 couples with the slant disc 90. Thus the output adaptor 78 "runs true" to the input rotation axis. The angle of the interface of the two slant discs has been exaggerated in the figures for clarity. The angle could be of a dimension that depends on the application of the lathe, but could be in the order of 0.323 degrees. It is noted that because the input adaptor 66 is solidly mounted to the shaft 68 and its face is perpendicular to the axis of rotation, the adaptor 66 serves as a positioning reference to the slant disc assembly 86. Referring to FIG. 9, the slant disc assemblies 86 and 88 with the discs are rotated in relation to each other by stopping the stop disc 96 until the pin 114 couples to the slant disc 90. In this position, the slant angle on the two slant discs add to each other causing the output surface of the assembly and the output adaptor 78 to display maximum angular runout with the input rotation axis.

With the novel alignment adjustment system of the present invention, the runout caused by a misalignment between the vehicle's hub axis and the axis of the lathe can be corrected without the time consuming and inaccurate manual methods of the prior art. With the novel system, additional adjustment motors are not necessary and accurate and automated realignment is possible when the novel alignment system is operated in conjunction with a measurement and control system of the type described below.

A second preferred embodiment incorporates the fundamental features of those disclosed with respect to the first embodiment, but permits adjustment with only one slant disc and the output pivots in one selectable axis only when driven by the slant disc. In the first preferred embodiment, the compensation vector (explained in more detail with reference to FIGS. 11a and 11b) necessary to adjust the angle of the output adaptor 78 could potentially require adjustment of two slant discs. The fixed pivoting axis of the second preferred embodiment eliminates this problem, requiring only one adjustment, potentially reducing the time required for shaft alignment.

Referring to FIG. 10a, there is shown a cross-sectional view of the automatic alignment coupling or mechanism 120 that occupies the same position of the mechanism 50 of the first embodiment shown in FIG. 4. Input adaptor 122 attaches to the rotating shaft of the lathe machine. Shaft 124 is attached to the input adaptor 122 such that the adaptor 122 mounting face is perpendicular to the shaft 124 so that shaft 124 runs true with the lathe machine axis. A second shaft 126 is placed over the shaft 124 and the rotated position of the second shaft 126 relative to shaft 124 is controlled by the stop disc assembly 128. The stop disc assembly 128 contains a gear train and operates similarly to the stop disc assemblies 94 and 88 of the first preferred embodiment. However, in this case, instead of driving a slant disc when the stop disc 130 is stopped by an electromagnetic catch, the second shaft 126 is driven and moves backwards relative to the shaft 124. Rotary movement of the shaft 126 also controls the rotary position of a pivot ring assembly 132 which is firmly attached to the second shaft 126. An output adaptor 134 is mounted on the shaft 124, held in place by a clamp ring 136, and caused to rotate with the shaft 124 by a drive disc 138.

A second stop disc assembly 130, containing a gear train, is mounted on the second shaft 126 and operates similar to stop discs 94 and 96 of the first preferred embodiment with the output of the gear train driving a single slant disc 140 detailed in FIG. 10c. When stop disc 130 is stopped, the slant disc 140 moves backward in relation to shaft 124. The axial force produced by an axially mounted drawbar 58, note again FIG. 4, causes the output adaptor 134, through the pivot ring 132 to assume an angle to the shaft 124 depending upon the rotated position of slant disc 140.

Referring to FIG. 10b, there is shown a cross-sectional view of automatic alignment mechanism rotated 90 degrees counterclockwise about the input axis of FIG. 10a. The pivot ring 132 does not rest against the stop disc assembly 130 over its entire surface. Rather, there are 2 "bumps" diametrically placed on the face of the pivot ring 132 which rest against the stop disc assembly 130. This allows the slant disc 140 to transmit its angle to the pivot ring 132 but allows the pivot ring 132 to pivot on its fixed axis pins 142. Thus, once set, the compensation vector necessary (explained in more detail with reference to FIGS. 11a and 11b) necessary for alignment does not change when the slant disc 140 varies the output compensation angle. Referring to FIG. 10d, there is shown the pivot ring assembly 132 in more detail. Specifically, by making one of the "bumps" on the pivot ring 132 a certain amount larger than the other, the pivot ring 132 is made perpendicular to the shaft 124 at one extreme position of slant disc 140 and at maximum compensation angle at the other extreme. A ½ degree variance, for example, is provided between the bumps as shown in FIG. 10d. Similarly, a ½ degree variance between the bumps on slant disc 140 is provided as shown in FIG. 10c. Thus, when the slant disc 140 and the pivot ring 132 are placed against the disc 130 with the ½ degree face angles complementing each other, a 0 degree runout between the input to output adapters is achieved. On the other hand, when the discs are rotated 180 degrees relative to each other, the angles oppose each other and the runout input and output is 1 degree.

Referring now to FIGS. 11a and 11b, there is shown a schematic depicting the relationship between the compensation vector, compensation angle, and pivot axis contemplated by the alignment device of the present invention. Generally, two parameters are of importance when aligning the rotating shafts of the lathe and brake hub. The first parameter referred to as the "compensation vector" is defined by the a rotation position at which the lateral runout deflection of the brake lathe is the greatest. The second parameter referred to as the "compensation angle" is defined by the angle that the input adaptor and the output adaptor must assume in relation to each other in order to compensate for this lateral runout. In the second embodiment, the compensation vector and the compensation angle can be adjusted separately as shown in FIG. 10a.

However, in the first and third (described below) embodiments, the compensation vector is adjusted by "stopping" simultaneously the input disc and output disc. This does not affect the relative rotational positions of the discs and thus does not change the input to output angle. Rather, adjustment of the compensation vector only changes the rotational position where the disc's angle changing capability is effective. The compensation angle is adjusted by "stopping" the output disc only, which rotates it in relation to the input disc and thus changes the input to output angle.

Referring now to FIGS. 12 through 16 there is shown a third preferred embodiment of the present invention. The third preferred embodiment is similar to the first preferred embodiment differing in that the slant discs are separated from each other and from the input and output adapters by pin roller thrust bearings to allow free rotation of these elements under normal axial pressure; the rotational positioning of the slant discs relative to each other and to the input and output adapters is performed by actuating four "starwheels" which drive the slant discs through gear trains; and both forward and reverse positioning capability of the slant discs is provided which allows a considerable decrease in time to final alignment.

Figure 12:
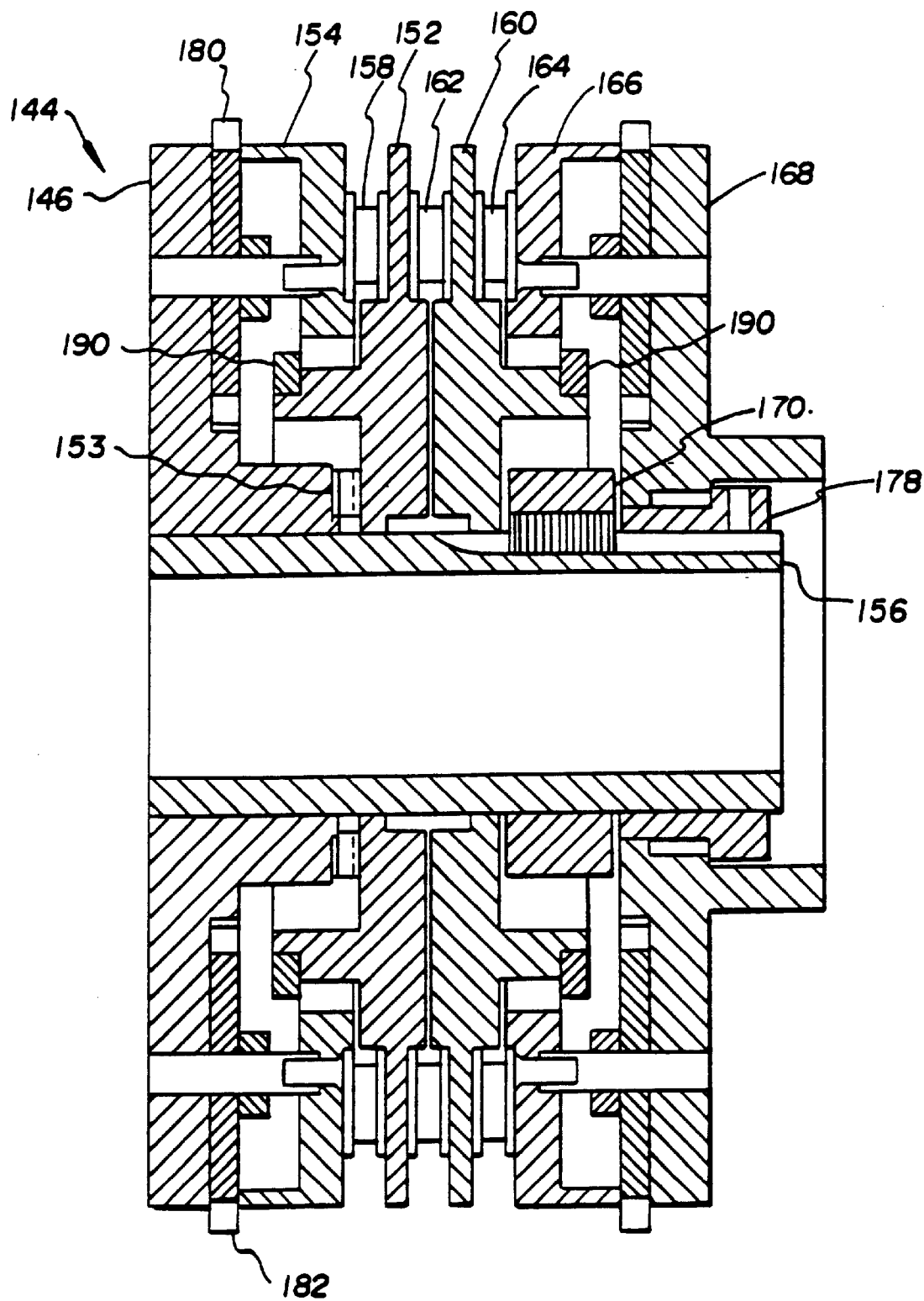
FIG. 12 is a cross-sectional view of the automatic alignment apparatus of the third preferred embodiment of the present invention.

Referring to FIG. 12, there is a cross-sectional drawing of an automatic alignment coupling or mechanism 144 that occupies the same position of the mechanism 50 of the first embodiment shown in FIG. 4. An input adaptor 146 attaches to and is rotationally driven by the output shaft of the brake lathe. Adaptor 146 contains two "starwheels" 180 and 182 which drive gear trains which ultimately position an input slant disc 152, described in more detail with reference to FIG. 13a. An adaptor cover 154 serves as a cover for the gearing and as a bearing surface which runs perpendicularly true to the shaft 156 which is attached to input adaptor 146.

Thrust bearing assembly 158, with its two race rings, are place between input slant disc 152 and the bearing surface of adaptor cover 154. This bearing assembly allows free rotation of the slant disc 152 relative to the input adaptor 146 and the attached shaft 156 while automatic alignment mechanism is under axial pressure in normal operation. Output slant disc 160 is separated from slant disc 152 by a thrust bearing assembly 162 identical to thrust bearing assembly 158 to allow output slant disc 160 to freely rotate under axial pressure. A third thrust bearing assembly 164 is placed between output slant disc 160 and the output adaptor cover 166, again to allow free rotation of the output slant disc 160.

Output adaptor 168 contains the same "starwheel" and gearing assembly as does input adaptor 146. It differs in that it is free to move to an angle that varies as much as 1 degree, for example, from perpendicular to the shaft 156 axis. Output adaptor 158 is rotationally coupled to the shaft 156 by means of a drive arm 170 that is keyed to the shaft 156. Referring to FIG. 13b, there is shown the input side of the output adaptor 168 without the starwheel and gears for clarity. The drive arm 170 is shown in place with key 172 coupling it to the shaft 156. A drive pin 174 is positioned in the output adaptor 168 and fits in the slot 176 of the drive arm 170 to cause the output adaptor 168 to rotate with the shaft 156 while allowing the output adaptor 168 to tip angularly in relation to the shaft 156.

Referring to FIG. 12, a collar 178 serves as both a bearing surface for the inside diameter of output adaptor 168 and a shoulder to prevent the disassembly of the parts when the auto align mechanism is not operating under axial pressure. A wave washer 153 or the like is placed between input slant disc 152 and input adaptor 146 in order to provide some friction so that rotation of output slant disc 160 will not cause unwanted rotation of the input slant disc 152.

Figure 13A:
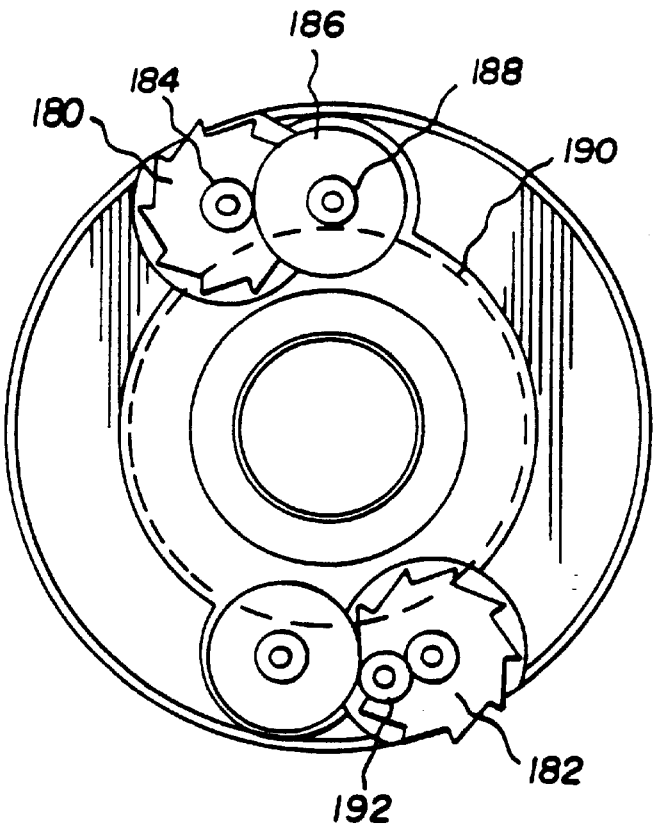
FIGS. 13a and 13b are front views of the input and output adaptor assemblies and a front view of the drive arm assembly, respectively, of the automatic alignment apparatus of the third preferred embodiment of the present invention.
Figure 13B:
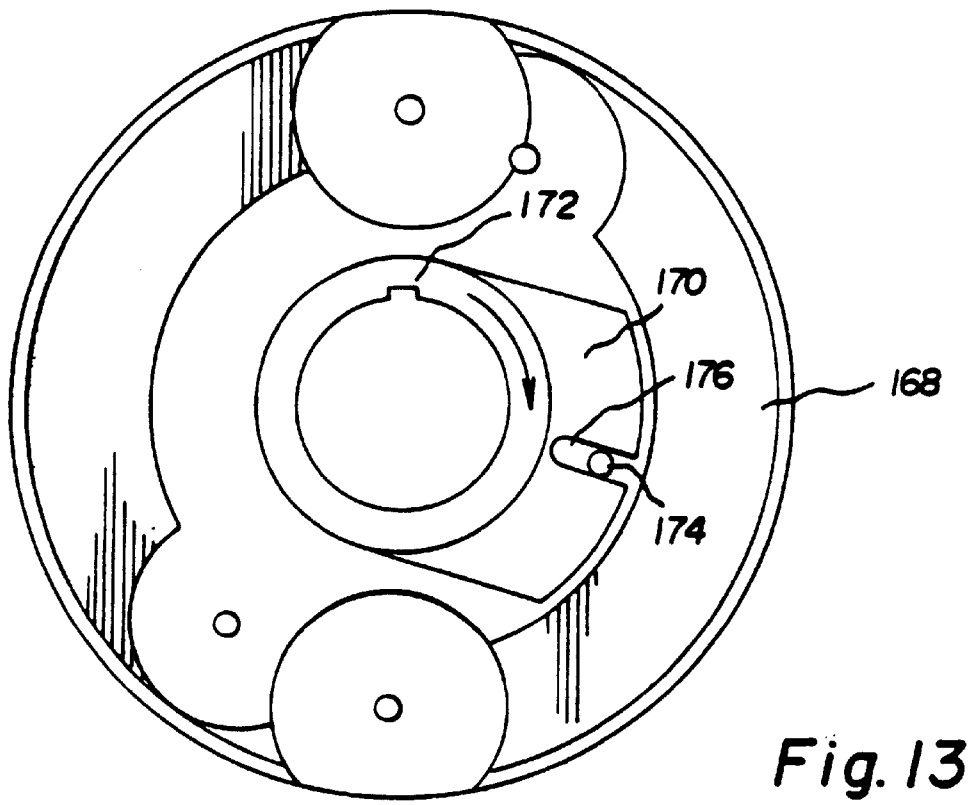

Referring to FIG. 13a, input and output adaptor assemblies preferably comprise a forward starwheel 180 that is coupled to a gear 184 having, for example, 18 teeth. Gear 184 meshes with a gear 186 having, for example, 56 teeth. Gear 186 is coupled to gear 188 having, for example, 18 teeth. Gear 188 meshes with a ring gear 190 having, for example, 140 teeth. The ring gear 190 is operably attached to a respective slant disc 152 or 160 as shown in FIG. 12.

Referring again to FIG. 13a, when the entire auto align mechanism rotates at 2.05 RPS, for example, in normal operation, the starwheel 180 can be caused to rotate by "catching" one or more teeth as the starwheel 180 passes by a fixed stop mechanism comprising an electromagnetic catch or the like. Thus, a slant disc can be caused to rotate in increments relative to the auto align mechanism. The reverse starwheel 182 and gear assembly operates similarly to the forward starwheel 180 and gear assembly except that an additional gear 192 causes the slant disc to rotate in the opposite direction when the starwheel 182 is rotated.

Figure 14:
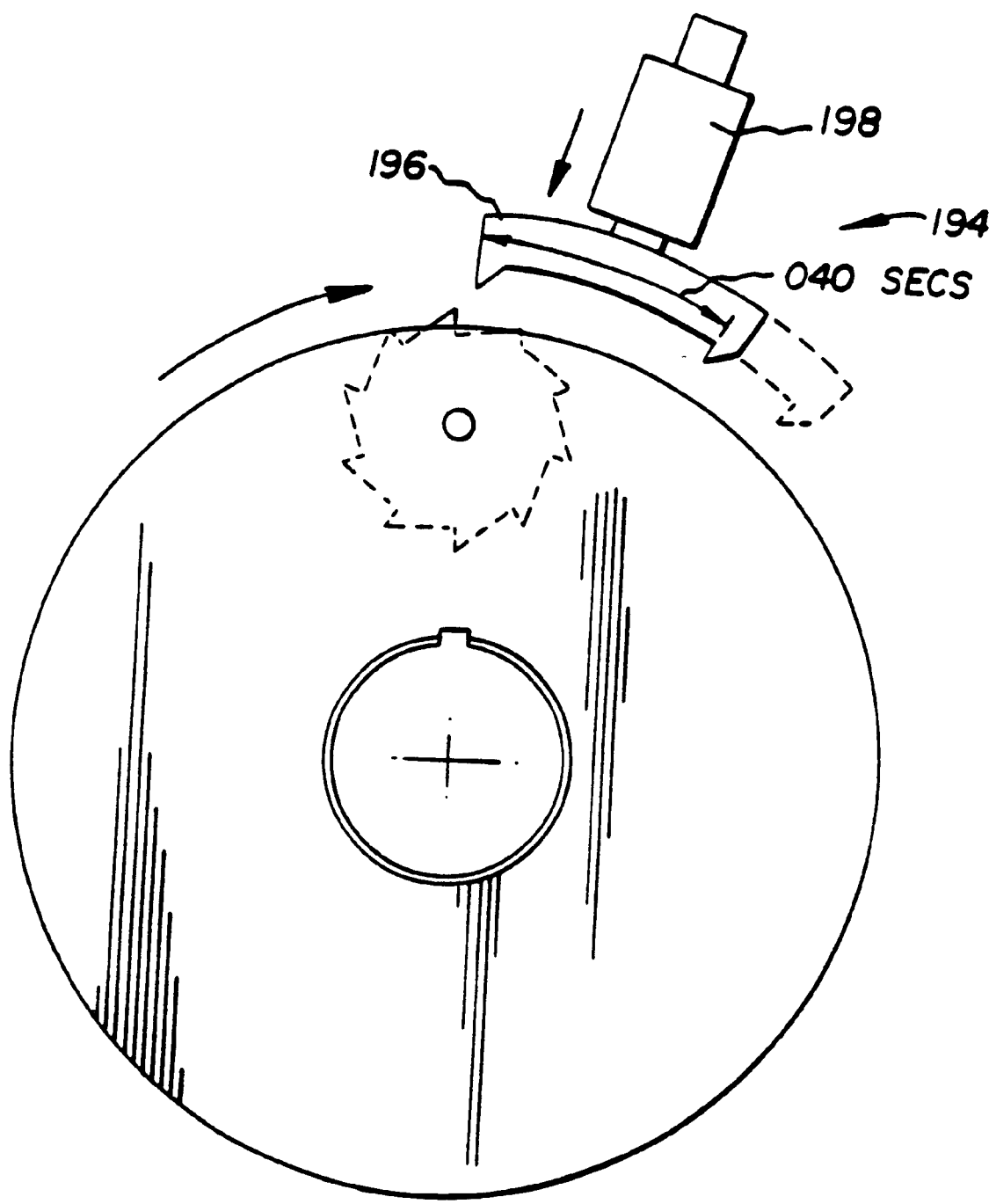
FIG. 14 is a front view of the starwheel stop mechanism of the of the automatic alignment apparatus of the third preferred embodiment of the present invention.

Referring to FIG. 14, there is shown starwheel stop mechanism 194 that comprises a toothed catch member 196 and a magnetic element such as solenoid 198 or the like. Preferably, one stop mechanism 194 is provided to operate in conjunction with the input adaptor 146 and another is provided to operate in conjunction with the output adaptor 168. The toothed member 196 may contain one or more teeth so as to "catch" one or more starwheel teeth each rotation of the automatic alignment mechanism. Note that the teeth of the member 196 are spaced apart so as to allow time to lift the toothed member between starwheel contact to control the amount of starwheel rotation per auto align mechanism rotation.

Figure 15:
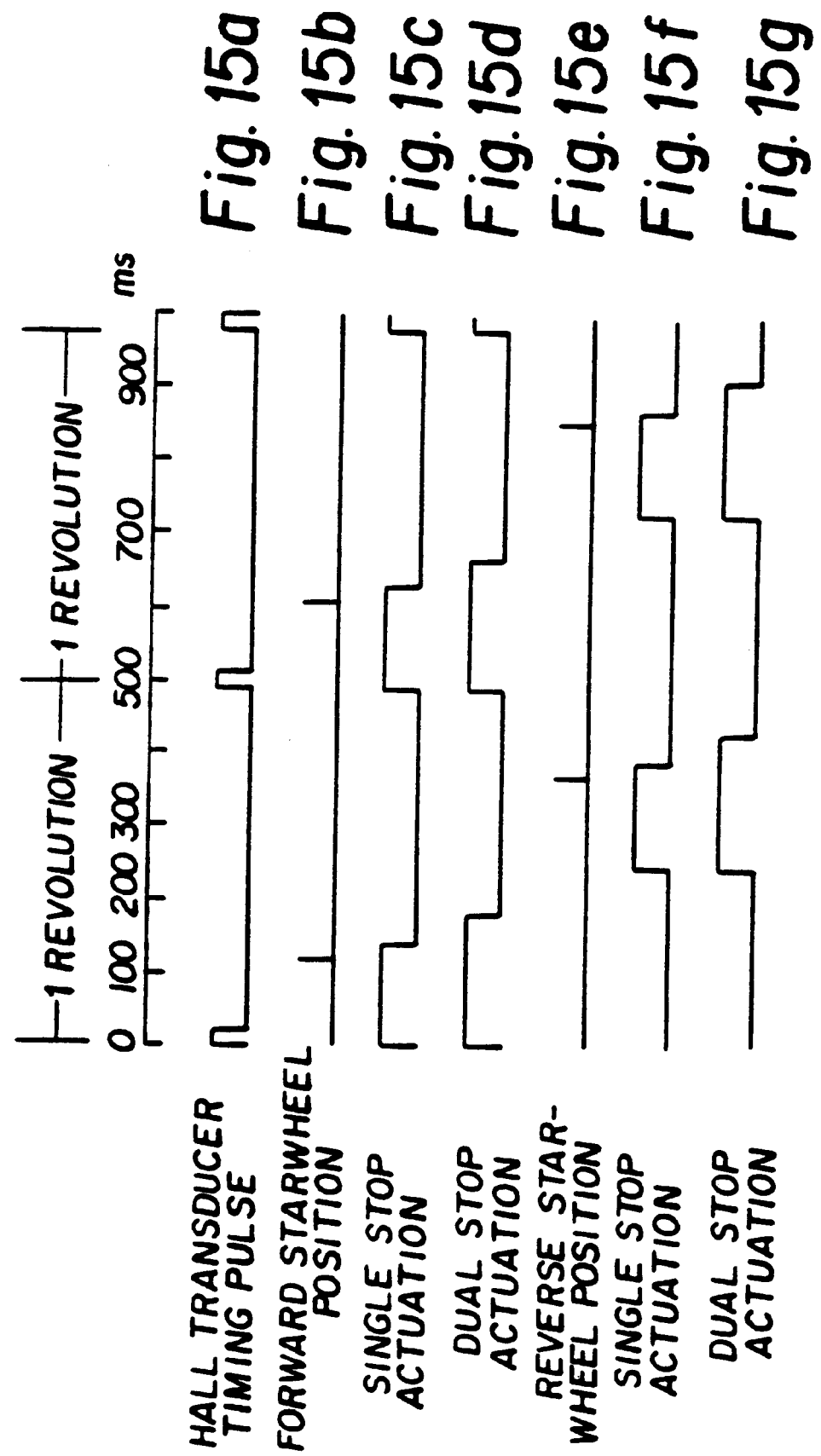

As the starwheels on each adaptor 146 and 168 are in line, the action of the starwheel "catch" or "stop" mechanisms have to be timed in synchronism with the rotation of the auto align mechanism in order that only the desired starwheel, (i.e. forward starwheel 180 or reverse starwheel 182) is actuated. FIG. 15 shows an exemplary timing control diagram for the starwheel stop mechanism 194. As shown, a hall transducer or the like timing pulse is used as a time reference point.

Referring to FIG. 16, there is shown a novel alignment process flow diagram as specifically exemplified with reference to the third preferred embodiment. It is noted that any suitable measurement device could be used in conjunction with the alignment mechanism. Preferably, however, a novel sensing and measuring device of the present invention as described below is utilized to operate in conjunction with the novel alignment mechanisms described above. It is also noted that although the alignment process is shown and described in FIG. 16 with reference to the third preferred embodiment, the general process algorithm is applicable to all embodiments of the present invention. Furthermore, the novel alignment apparatus and process may also be advantageously utilized in other practical applications in order to align two concentrically rotating shafts.

In general, the flow diagram of FIG. 16 shows a sequence of "trial and error" adjustments wherein an adjustment is initially made by stopping a star wheel on one of the adapters and measuring the change in the runout or alignment. If the runout improved, an additional adjustment is ordered in the same direction. If the alignment worsens, an adjustment in the opposite direction is ordered. This process is repeated until the alignment is corrected to within specifications and the lathe shaft and hub axes are aligned. Two distinct periods of adjustment are employed in the present invention. A first cycle takes place wherein large adjustments are made in the orientation of slant discs 152 and 160 to more significantly change the alignment of the shaft and hub axes, and thereby correct runout. Once alignment reaches a predetermined low level, finer adjustments are made to correct runout to within specified tolerances.

Referring to FIG. 16, the runout correction process begins with initialization of several variables. At step 302, the stop level of stop mechanism 194 is set to three actuations of the starwheels. This provides the large movements of slant discs 152 and 160 at the beginning of the adjustment cycle. Also at step 302, several internal counts and limits are initialized including flag Z, flag D, and a try counter. Also, the initial specification value is supplied which represents an acceptable level of runout. Typically, this value is set to be in the order of 0.001 inch. The try counter operates when runout drops to a "Min" value. This counter causes the value of "Spec" to increase after the system tries to reach the present "Spec" runout value a programmed number of tries or cycles. This prevents the system from trying to forever reach a runout value that is impossible given the circumstances.

An initial evaluation of the runout is made at step 303 and this quantity is stored a R-pres, representative of a base value of the runout. Step 304 provides for a comparison of the measured runout with a runout measurement that conforms to specification, usually on the order of 0.001 inches as noted above. If the runout is less than 0.001 inches, the runout is determined to fall within specified tolerances ("Spec") and no further compensation is required as is indicated in step 310. At step 306, the value of R-pres is copied into the memory location of R-last. Next, if R-pres does not exceed a predetermined level "Min" (step 307), the stop mechanism 196 is set to stop one tooth of the starwheel 180 or 182 per revolution as indicated in step 308. At step 309, the try count is incremented and at step 310 the try count is evaluated such that of the try count is at a limit, the runout "Spec" limit is raised (step 311) and the try count is reset to 0 (step 312). The higher "Spec" limit usually consist of a value that is still acceptable but less preferred than the original "Spec" limit (e.g. 0.001 inch). For example, 0.003 inch higher "Spec" is acceptable.

At step 313, the flag Z is tested to determine if starwheel actuation has run in both directions. That is, whether both output 180 (forward) and 182 (reverse) starwheel have been activated. At step 10, if the Z flag has not been toggled twice, then the program proceeds to step 315 to determine the state of flag D and if the Z flag has been toggled has been toggled twice, then step 314 toggles flag D. If D equals 0, then the output only starwheel is actuated changing the "compensation angle" of the system. If D equals 1, both the output and input starwheels are actuated to change the "compensation vector" of the system.

At step 318, the system waits for one of two revolutions of the lathe (depending on whether the accelerometer is operating in mode 1 or mode 2 as described below) before proceeding in order to allow transients introduced by the last starwheel adjustment to dissipate. At step 319, the runout is again measured. In step 320, if runout is less than Spec (e.g. 0.001 or 0.003 inches), the system progresses to step 305 and the runout adjustment is complete. At step 321, the runout from the present measurement, R-pres, is compared to the runout from the last measurement, R-last. If R-pres is less than R-last, the system progresses to step 306 where R-pres is copied into R-last and the process continues through another iteration and the same starwheel previously actuated is again actuated. If, on the other hand, R-pres is greater than R-last, the system progresses to step 322 where flag Z is toggled to its opposite state. Control is then passed back to step 306 where in turn the other starwheel of the starwheel pair is actuated to cause rotation of the adjustment disc in an opposite direction.

In this manner, the system employs a trial and error approach to reducing runout. As long as the runout continues to decrease, additional actuations of the same starwheel occur. However, if runout worsens, the opposite starwheel is actuated to begin to correct the runout. If this forward and reverse cycle does not improve the runout, the compensation vector is adjusted by moving both of the input and output adjustment discs. A microprocessor and suitable circuitry controls the operation of the present invention as described below with reference to FIG. 23.

The alignment adjustment system of the present invention is a substantial improvement over prior art devices and techniques. Once the appropriate sensor and measuring system is properly secured (for example, one of the novel systems disclosed below), the automatic alignment system provides for mechanical compensation of the total lateral runout present in the disc brake assembly. Specifically, the alignment system adjusts the alignment of the brake lathe component with respect to a vehicle hub in order to compensate for lateral runout. This, in turn, ensures that the cutting head 36 is placed perpendicular to the rotation axis of the hub 44.

Lateral Runout Measurement and Control System

The apparatus and method for runout compensation disclosed above serves to align the lathe and rotor axes under the direction of an angular runout sensing and control mechanism of the present invention. However, it is to be understood that the runout sensing and control mechanism described herein may be used with any suitable sensor that is responsive to angular acceleration or variations in the distance between the cutting tool end of the lathe body and the auto under consideration. In the present invention, the runout sensor preferable takes the form of an electronic accelerometer. The novel measurement and control system may also be advantageously utilized in other practical applications in order to align two concentrically attached rotating shafts.

Referring to FIGS. 17 and 18, there is shown a brake lathe assembly, coupled through an auto align mechanism of the type shown and described above to a wheel axle. The lathe tools are shown at the end of the brake assembly mechanism arm, arranged to move from the center of the brake disc toward the outside while the drive motor causes the wheel and brake disc to rotate as described above. The solid lines show the mechanism position when the wheel axis and the lathe axis are in alignment. Under these conditions the lathe tools cut the disc surfaces smoothly.

However, where runout is present, the lathe will rotate back and forth when in use. The dotted lines show the wobbling of the lathe mechanism when the wheel axis and the lathe axis are misaligned (in the drawing the runout is greatly exaggerated). Obviously, with the lathe mechanism and tools wobbling the brake disc lateral runout is cut into the rotor and such operation is not acceptable. Note that at the "X" point the mechanism changes its position not only linearly but also in a rotational sense perpendicular to the drive axis. That is, the angle of the mechanism changes cyclically as the wheel is rotated.

It is at this point that the sensing devices of the runout sensing and control mechanism of the present invention are preferably placed in order optimize measurement sensitivity. Preferably, the sensing devices are additionally positioned such that the internal rotor axis (as described below) is perpendicular to the lathe drive axis.

Referring to FIG. 18, there is another misalignment mode which can occur when the wheel axis and the lathe axis are in misalignment. This is off-center misalignment. With this, the motion of the lathe mechanism contains only linear components while no angular runout occurs, therefore no rotational motion perpendicular to the drive axis occurs. This runout motion does not detract significantly from the smooth cutting of the brake disc surface and can be allowed. For this reason, it is an objective that the sensing device of the present invention sense only the rotation components impressed upon its housing while rejecting all linear motions.

A variety of different sensing configurations can be used as a part of the runout sensing and control mechanism of the present invention. Generally, there are two operating modes employed in utilizing the rotary accelerometer as a runout detector. In a first mode the natural frequency of resonant motion of the rotor transducer is configured (as explained below) to be about 1.5 times the frequency of lathe rotation. In this mode configuration, the accelerometer achieves the most rapid following of the changes in runout and therefore, often the most rapid alignment due to damping inherent in the frequency differential. However, the runout sensitivity of the system is less than ½ that of mode two. In mode two, the natural frequency of resonant motion of the rotor-transducer is configured to be below the frequency of lathe rotation. This provides the most sensitivity to runout and helps to suppress harmonics in the runout motion which can cause alignment uncertainty. However, this mode configuration is slower in following changes in runout which may slow alignment as compared to mode configuration one. In any event, the natural frequency of resonant motion should never by placed at the frequency of lathe rotation because operating in resonance with the lathe results in an unnatural buildup of rotor-transducer motion which doesn't allow the accelerometer output to immediately follow the runout magnitude, seriously slowing the alignment process.

Independent of the operation mode, several considerations are relevant in implementing each of the embodiments of the inventive accelerometer. First, the accelerometer rotor should be completely balanced in order to insure measurement of rotational accelerations, while rejecting linear accelerations. Second, the rotation of the rotor should be physically limited such that rotation only occurs within the sensitive area of the transducer. Finally, the natural frequency of resonant motion of the rotor-transducer should be configured to operate in either mode 1 or 2 as already discussed above. In this regard, the natural frequency depends on several variable including mass of the rotor, diameter of the rotor, and characteristics of a spring element (e.g. music wire).

The accelerometer embodiment using a piezo-electric element as a sensor (described below) is best suited to operating where the natural frequency of resonant motion is about 1.5 times the frequency of lathe rotation because some force is required to bend the element tending to cause a high spring rate. The other transducer schemes described below are non-contact devices and the spring rate can be dictated by spring selection. In this regard, these embodiments are well suited to either mode one or mode two operation.

In a first embodiment as shown in FIG. 19 there is a rotary accelerometer sensor 210. Sensor 210 comprises a housing 212 that encloses a rotor 214 mounted for rotation on bearings 216 and 218. The rotor 214 is carefully balanced so that all accelerations except rotational cause no rotation of the rotor 214. Rotation of the rotor 214 is sensed by a piezo electric element 220 which is mounted between the housing 212 and the rotor 214 and is bent by any rotation of the rotor 214 producing a voltage proportional to the magnitude of bending. Rotation of the rotor 214 is limited to protect the piezo electric element 220 by piezo element mount 220 in the slot 222 in the rotor 214.

The piezo disc 220 and the rotor 214 operate as a spring and mass system having a natural frequency of resonant motion as generally described above. In this spring/mass system, the rotor constitutes the mass and the piezo disc 220 constitutes the spring. In this embodiment, the system operates in mode one such that the rotor mass and diameter and the piezo spring quality is adjusted to obtain a frequency in the order of 1.5 times the frequency of lathe rotation. It is of further importance that the rotor 11 be suitably damped in order to minimize the settling time. This can be achieved by filling the housing 10 with a viscous fluid and sealing the housing with a cover. Alternatively, damping can be provided by using a clinging viscous material in the bearings 12 and 13. Other damping techniques are considered to be within the scope of the invention. A resultant signal, whose amplitude is proportional to the magnitude of the angular runout, is then directed to a control system as described below with reference to FIG. 23.

The sensing device of the present invention may also be configured with alternative transducing elements that provide a suitable control signal. For example, the inventive sensor may be sensing element comprising an accelerometer with a tuned coil oscillator. Referring to FIG. 22, the spring component of this system comprises a wire (preferably music or piano wire) 244 that is attached to the body 256 and rotor 246 as shown. The wire may be attached by any suitable means such as, for example, brackets as shown in FIG. 22. As previously noted, the natural frequency of resonant motion of the rotor-transducer is dependant on the mass and diameter of the rotor and spring characteristics. When using a music wire 244 to control frequency a shown, the tension of the wire 244 and the wire 244 gage are manipulated to vary the frequency. For example, to achieve a natural frequency or resonant motion of the rotor-transducer that is below the frequency of lathe rotation, a gage in the range of approximately 9–10 thousandths is utilized and the wire tension is configured to be relatively loose. On the other hand, to achieve a natural frequency of resonant motion of the rotor-transducer that is about 1.5 times the frequency of lathe rotation, a gage in the range of approximately 16 thousandths is utilized and the wire tension is configured to be relatively tight.

A ferrite or the like disc 248 is placed in the periphery of the rotor 246 adjacent to a housing-mounted coil 250 which forms the -L- of an oscillator circuit 252. When the rotor 246 turns, the ferrite disc 248 moves in relation to the coil 250, causing a change in the inductance of the oscillator coil 250, thus a change in the frequency of oscillation. A discriminator 254 converts the change in frequency of oscillation to a varying DC voltage. This varying voltage reflects the rotation of the accelerometer housing 256. The signal is then forwarded to a control system as described below with reference to FIG. 23.

As previously noted, it is important to configure the rotor such that it is balanced. In order to limit the rotation of the rotor such that rotation only occurs within the sensitive area of the transducer, a counterbore 245 is provided that cooperates with a pin 247 to limit rotor rotation as appropriate. Other limiting means are within the scope of the invention.

In an alternative embodiment the sensing device is an accelerometer with an magnet-hall effect transducer as shown in FIG. 20. In this configuration, a leaf spring 222 has a spring rate which, in combination with the inertia of the rotor 224, provides a resonant frequency about 1.5 times the rotational rate of the brake lathe shaft (i.e. operation in mode one). Alternatively, the accelerometer of this embodiment could be configured to operate in mode one or two using a music wire as described above. A magnet 226 is placed in the periphery of the rotor 224. A hall effect transducer 228 with a linear characteristic is placed in the housing 230 adjacent to the magnet 226 such that rotary motion of the rotor is reflected in the output voltage of the hall effect transducer 228. The magnitude of the AC voltage at the output of the hall effect transducer 228 is a reflection of the rotary motion of the accelerometer housing 230 that is attached to the lathe, preferably at the position identified with reference to FIGS. 17 and 18. The resulting signal is forwarded to a control system as described below with reference to FIG. 23.

In yet another alternative embodiment, the sensing element comprises an accelerometer with an infrared generator. Referring to FIG. 21 and 21a, there is shown a leaf spring 232 that preferably has a spring rate which, in combination with the inertia of a rotor 234, provides a resonant frequency about 1.5 times the rotational rate of the brake lathe shaft. Again, this accelerometer could alternatively be configured to operate in mode one or two using a music wire as described above. An infrared generator diode 236 is placed facing an infrared detector diode 238 on the housing 240 near the periphery of the rotor 234.

A shutter 242 is attached to the rotor 234 and projects between the IR generator 236 and IR detector 238 such that rotary motion of the rotor 234 varies the amount of radiant energy transferred, causing the voltage out of the IR detector 238 to reflect the magnitude of housing 240 rotation. Again, this measurement reflecting the runout of the disc coupling. The signal is forwarded to a control system as described below with reference to FIG. 23.

The runout sensing and control mechanism of the present invention further comprises a control circuit which is now described with reference to FIG. 23. Transducer 400 may be advantageously comprised of any of the several different types of sensors designed to evaluate the rotational acceleration of the lathe as set forth below. Because lateral runout manifests itself in varying rotational motion imparted to the lathe, any sensor arrangement capable of producing an accurate qualitative measure of rotational acceleration may be utilized. The preferred structured herein utilizes an inertial disc and piezo electric element as transducer 400, as described in greater detail below. The output of transducer 400 is fed to amplifier 402 and then to rectifier 404. Because runout produces a cyclical motion in the lathe, the signal produced by transducer 400 is sinusoidal in nature; however, at lower runout levels other wave forms could resonate. After amplification by amplifier 402 and rectification by full wave rectifier 403, the peak runout signal is feed to an integrator 404 that is reset 406 each lathe rotation cycle as indicated. The signal is then sent to a sample and hold circuit 407. A hall pickup timer 405 produces a synchronization signal as shown. The output is then transmitted to A/D converter 408 which samples the voltage level and produces a digital representation thereof. The output of A/D converter 408 is passed to both latch 410 and microprocessor 412. The output of latch 410 is also provided to microprocessor 412. Latch 410 is a conventional sample and hold latch and is clocked just prior to the time A/D converter 408 presents a new sample. In this manner, both the current sample taken by A/D converter 408 and the last sample taken by A/D converter 408 are available to microprocessor 412. At the output of microprocessor 412 there is provided amplifiers 414 and 416 which are used to drive stop mechanism 196.

Taken in conjunction with the algorithm set forth in FIG. 16, microprocessor 412 is thus provided with a stream of samples of the runout of the rotor under consideration, together with a sample representing the last historical value of the runout. In this manner, the microprocessor implements the trial and error approach described above with respect to FIG. 16.

SUMMARY OF MAJOR ADVANTAGES OF THE INVENTION

After reading and understanding the foregoing detailed description of an inventive on-car brake lathe with automatic alignment system and process in accordance with preferred embodiments of the invention, it will be appreciated that several distinct advantages of the subject alignment system and process are obtained.

Without attempting to set forth all of the desirable features of the instant on-car disc brake lathe with automatic alignment system, at least some of the major advantages include providing an on-car disc brake lathe having an automated alignment assembly 50 that includes a pair of adjustment disc assemblies that are positioned between an input adaptor 66, 122, 146 and an output adaptor 78, 134, 168. Each of the adjustment disc assemblies includes an adjustment disc 90, 92, 140, 152, 160 and associated stop disc. An electromagnetic catch 98, 100 or the like is operably associated with each of the stop discs 94, 96 and operates in response to a control signal issued from a control system. When the rotation of one of the stop discs is stopped, rotational movement of the lathe drive shaft is transferred, through appropriate gearing, to a respective adjustment disc to change the relative position of the lathe drive axis and the vehicle hub axis.

In a preferred embodiment, the control algorithm and alignment process of the present comprises a series of "trial and error" adjustment inquiries in order to compensate for runout. As the lathe begins to rotate and the Hall signal provides a timing signal, and the runout level is evaluated and if within the "Spec" limit, normally 0.001", the alignment goes to the "Low-Ready to Cut" light and the program ends. If the runout is above the "Spec" limit, an actuation of the output forward starwheel is ordered. The runout is evaluated and if lower, added actuations of the same starwheel are ordered until an actuation causes the runout to increase. At this point, if the runout is still above the "Spec" limit, an actuation of the output reverse starwheel is ordered. If the runout is lower, further such actuations are ordered until an actuation causes the runout to increase. The previous two actions adjusts the "compensation angle." At this point, if the runout is still above the "Spec" limit, an actuation of both the output and the input forward starwheels in tandem is ordered. This action adjusts the "compensation vector." The runout is evaluated and if lower, further actuations of the output and input forward starwheels in tandem are ordered until an actuation causes the runout to increase.

At this point, if the runout is still above the "Spec", an actuation of the output and input reverse starwheels in tandem is ordered. The runout is evaluated and if lower, further such actuations are ordered. If an actuation causes a runout increase, and if the runout is still above the "Spec" limit, the starwheel actuations revert to the output starwheels only mode again as described previously. This actuation sequence continues as above, trial and error, until the runout is reduced to the "Spec" limit, where the "Ready to Cut" light is illuminated and the program ceases.

A count is kept of the number of tries to reach the "Spec" runout level and when a preset number of tries is exceeded, the acceptance level is raised to about 0.003" and if the runout is within this level, a "Ready to Cut" light is illuminated and the program ceases. If this new higher runout level can not be reached after a preset number of tries, a "Out of Spec" lite is illuminated and the program ceases. The operator is directed to check the lathe coupling to the brake disc hub and to check for bad wheel bearings, correct the problem and try the alignment cycle again. Depending on the level of runout, the system can be controlled such that 3 starwheel teeth are "caught" in each starwheel actuation for rapid adjustment or only 1 starwheel tooth is caught each actuation allowing fine adjustment of the runout level.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. An on-vehicle disc brake lathe system for resurfacing a brake disc of a vehicle brake assembly, the vehicle brake assembly having an axis of rotation and the brake lathe system comprising:
 a lathe body with a driving motor;
 a cutting head operably attached to the lathe body;
 a drive shaft extending from the lathe body and operably connected to the driving motor so as to be rotated by the driving motor;
 a mechanical coupling connected to the drive shaft and configured to provide an adjustable connection between the drive shaft and the vehicle brake assembly; and
 an electronic control system connected to the mechanical coupling and operable to automatically adjust the adjustable connection provided by the mechanical coupling to reduce movement of the lathe body relative to the vehicle brake assembly as the drive shaft rotates so as to improve alignment of the lathe body and the cutting head relative to the axis of rotation of the vehicle brake assembly.

2. The on-vehicle brake lathe system of claim 1 wherein the driving motor is operable to initiate rotation of the drive shaft and the electronic control system is operable to sense movement of the lathe body resulting from rotation of the drive shaft.

3. The on-vehicle brake lathe system of claim 2 wherein the electronic control system is operable to reduce movement of the lathe body until movement of the lathe body falls below a predetermined threshold amount.

4. The on-vehicle brake lathe system of claim 2 wherein movement of the lathe body results from a misalignment of the axis of rotation of the vehicle brake assembly relative to an axis of rotation of the drive shaft and the adjustable connection provided by the mechanical coupling serves to change an alignment of the axis of rotation of the vehicle brake assembly relative to the axis of rotation of the drive shaft.

5. The on-vehicle brake lathe system of claim 1 wherein the electronic control system comprises a sensor operable to produce a signal indicative of movement of the lathe body.

6. The on-vehicle brake lathe system of claim 5 wherein the electronic control system further comprises an electronic controller connected to receive the signal from the sensor, to generate a control signal in response to the signal from the sensor, and to provide the control signal to the mechanical coupling.

7. The on-vehicle brake lathe system of claim 6 wherein the mechanical coupling comprises a first component connected to the drive shaft, a second component including structure for connection to the vehicle brake assembly, and an adjustment mechanism positioned between the first component and the second component, connected to receive the control signal from the electronic controller, and operable to automatically adjust an axis of rotation of the second component with respect to an axis of rotation of the drive shaft in response to the control signal from the electronic controller.

8. The on-vehicle disc brake lathe system of claim 7 wherein the adjustment mechanism comprises at least one stop disc operable to selectively follow the rotation of the drive shaft or to rotate relative to the drive shaft in response to the control signal from the electronic controller.

9. The on-vehicle disc brake lathe system of claim 8 wherein:
 the adjustment mechanism further comprises at least one adjustment component associated with the stop disc and operable to rotate in response to the relative rotation of the stop disc, and
 an axial alignment of the second component relative to the first component varies based on a rotational orientation of the adjustment component.

10. The on-vehicle disc brake lathe system of claim 8 wherein the adjustment mechanism further comprises at least one stop mechanism associated with the stop disc, the stop mechanism being operable to move between a first position in which the stop disc follows the rotation of the drive shaft and a second position in which the stop disc rotates relative to the drive shaft, the stop mechanism moving between the first and second positions in response to the at least one control signal from the electronic controller.

11. The on-vehicle disc brake lathe system of claim 10 wherein the stop mechanism comprises a catch member operable to move from the first position to the second position in response to the at least one control signal.

12. The on-vehicle disc brake lathe system of claim 11 wherein the at least one stop disc comprises at least two stop discs rotatably secured to the first component such that the stop discs follow the rotation of the first component when the stop mechanism is in the first position and at least one of the stop discs rotates relative to the first component when the stop mechanism is in the second position.

13. The on-vehicle disc brake lathe system of claim 11 wherein:
 the adjustment mechanism further comprises:
  a first adjustment component associated with a first stop disc and operable to rotate in response to the relative rotation of the first stop disc, and
  a second adjustment component associated with a second stop disc and operable to rotate in response to the relative rotation of the second stop disc; and
 an axial alignment of the first component relative to the second component varies based on rotational orientations of the first and second adjustment components.

14. The on-vehicle brake lathe system of claim 13 wherein the first and second adjustment components comprise slant discs, each having a slanted surface such that the slanted surfaces of the slant discs are opposed to each other in an abutting relationship.

15. The on-vehicle disc brake lathe system of claim 10 wherein the at least one stop disc comprises a starwheel having protruding teeth.

16. The on-vehicle disc brake lathe system of claim 15 wherein the stop mechanism comprises a catch member operable to move from the first position to the second position to engage at least one of the teeth of the starwheel.

17. The on-vehicle disc brake lathe system of claim 16 further comprising at least a second stop disc, wherein the electronic controller is operable to control generation of the at least one control signal to time the actuation of the stop mechanism such that the catch member moves into the second position at a time appropriate to contact a specified one of the stop discs.

* * * * *